(12) United States Patent
Elias

(10) Patent No.: US 11,232,137 B2
(45) Date of Patent: Jan. 25, 2022

(54) METHODS FOR EVALUATING TERM SUPPORT IN PATENT-RELATED DOCUMENTS

(71) Applicant: LEXISNEXIS, A DIVISION OF REED ELSEVIER INC., Miamisburg, OH (US)

(72) Inventor: Brian K. Elias, Springboro, OH (US)

(73) Assignee: RELX Inc., Miamisburg, OH (US)

(*) Notice: Subject to any disclaimer, the term of this patent is extended or adjusted under 35 U.S.C. 154(b) by 399 days.

(21) Appl. No.: 16/280,535

(22) Filed: Feb. 20, 2019

(65) Prior Publication Data

US 2019/0179839 A1 Jun. 13, 2019

Related U.S. Application Data

(63) Continuation-in-part of application No. 14/323,501, filed on Jul. 3, 2014, now abandoned, which is a continuation-in-part of application No. PCT/US2013/076160, filed on Dec. 18, 2013.

(60) Provisional application No. 61/880,449, filed on Sep. 20, 2013, provisional application No. 61/738,703, filed on Dec. 18, 2012.

(51) Int. Cl.
  *G06F 16/332* (2019.01)
  *G06Q 50/18* (2012.01)
(52) U.S. Cl.
  CPC ....... *G06F 16/3322* (2019.01); *G06Q 50/184* (2013.01)
(58) Field of Classification Search
  CPC .......................... G06F 16/3322; G06Q 50/184
  See application file for complete search history.

(56) References Cited

U.S. PATENT DOCUMENTS

| | | |
|---|---|---|
| 5,774,833 A | 6/1998 | Newman |
| 6,236,993 B1 | 5/2001 | Fanberg |
| 6,236,998 B1 | 5/2001 | Lehtinen |
| 7,162,465 B2 | 1/2007 | Jenssen et al. |
| 7,792,858 B2 | 9/2010 | Tang et al. |

(Continued)

OTHER PUBLICATIONS

"Patent Attorney Creates Word Plugin for Patent Applications" retrieved from url:ipwatchdog.com (2009).*

(Continued)

*Primary Examiner* — Julie M Shanker
(74) *Attorney, Agent, or Firm* — Dinsmore & Shohl LLP

(57) ABSTRACT

In one embodiment, a method of evaluating a term in a patent-related document includes receiving a selected term, generating one or more variant suggestions related to the selected term, displaying the one or more variant suggestions, receiving one or more selected variant suggestions from the one or more variant suggestions, and associating the one or more selected variant suggestions with the selected term. In another embodiment, a method of evaluating a term in a patent-related document includes displaying a list of terms appearing in a first patent-related document and a second patent-related document, displaying a graphical representation of whether or not individual terms in the list of terms appear in the first patent-related document or the second patent-related document, and receiving a selected term from the list of terms. The method further includes displaying one or more variant suggestions related to the selected term.

20 Claims, 21 Drawing Sheets

(56) References Cited

U.S. PATENT DOCUMENTS

| | | | |
|---|---|---|---|
| 8,037,086 B1 | 10/2011 | Upstill et al. | |
| 8,161,041 B1 | 4/2012 | Grushetskyy et al. | |
| 8,285,714 B2 * | 10/2012 | Ji | G06F 16/3322 |
| | | | 707/728 |
| 8,392,413 B1 | 3/2013 | Grushetskyy et al. | |
| 8,504,562 B1 | 8/2013 | Ikeda et al. | |
| 10,115,170 B2 | 10/2018 | Elias et al. | |
| 2002/0082778 A1 | 6/2002 | Barnett et al. | |
| 2003/0225755 A1 | 12/2003 | Iwayama et al. | |
| 2003/0225773 A1 | 12/2003 | Jenssen et al. | |
| 2004/0006457 A1 | 1/2004 | Dehlinger et al. | |
| 2004/0006459 A1 | 1/2004 | Dehlinger et al. | |
| 2005/0216828 A1 | 9/2005 | Brindisi | |
| 2006/0004730 A1 | 1/2006 | Chan | |
| 2006/0224328 A1 | 10/2006 | Kim | |
| 2007/0288256 A1 * | 12/2007 | Speier | G06F 16/93 |
| | | | 715/208 |
| 2008/0154848 A1 | 6/2008 | Haslam et al. | |
| 2008/0195604 A1 | 8/2008 | Sears | |
| 2008/0281860 A1 | 11/2008 | Elias et al. | |
| 2009/0019038 A1 | 1/2009 | Millett | |
| 2009/0070317 A1 * | 3/2009 | Cooper | G06Q 10/10 |
| 2009/0228777 A1 | 9/2009 | Henry et al. | |
| 2009/0276694 A1 | 11/2009 | Henry et al. | |
| 2009/0299853 A1 | 12/2009 | Jones et al. | |
| 2009/0307577 A1 | 12/2009 | Lee | |
| 2010/0131513 A1 | 5/2010 | Lundberg et al. | |
| 2011/0047166 A1 | 2/2011 | Stading et al. | |
| 2011/0055206 A1 * | 3/2011 | Martin | G06F 40/174 |
| | | | 707/723 |
| 2011/0137893 A1 | 6/2011 | Shnitko et al. | |
| 2011/0307499 A1 | 12/2011 | Elias et al. | |
| 2012/0124041 A1 | 5/2012 | Bawri et al. | |
| 2012/0259787 A1 * | 10/2012 | Speier | G06Q 50/184 |
| | | | 705/310 |
| 2012/0278244 A1 | 11/2012 | Lee et al. | |
| 2012/0278341 A1 | 11/2012 | Ogilvy et al. | |
| 2012/0310911 A1 | 12/2012 | Harrison | |
| 2012/0310930 A1 | 12/2012 | Kumar et al. | |
| 2013/0246436 A1 | 9/2013 | Levine | |
| 2013/0262968 A1 | 10/2013 | Gartman et al. | |
| 2014/0317001 A1 | 10/2014 | Elias | |
| 2014/0317096 A1 | 10/2014 | Elias et al. | |
| 2014/0317097 A1 | 10/2014 | Elias et al. | |
| 2019/0012753 A1 | 1/2019 | Elias et al. | |

OTHER PUBLICATIONS http://www.pattools.com/claimchart.html, (2010).*
https://www.uspto.gov/sites/default/files/patents/law/comments/claimmaster08mar2010.pdf.*
PCT International Search Report and Written Opinion of the International Searching Authority for PCT/US13/76160, dated May 16, 2014, 15 pages.

* cited by examiner

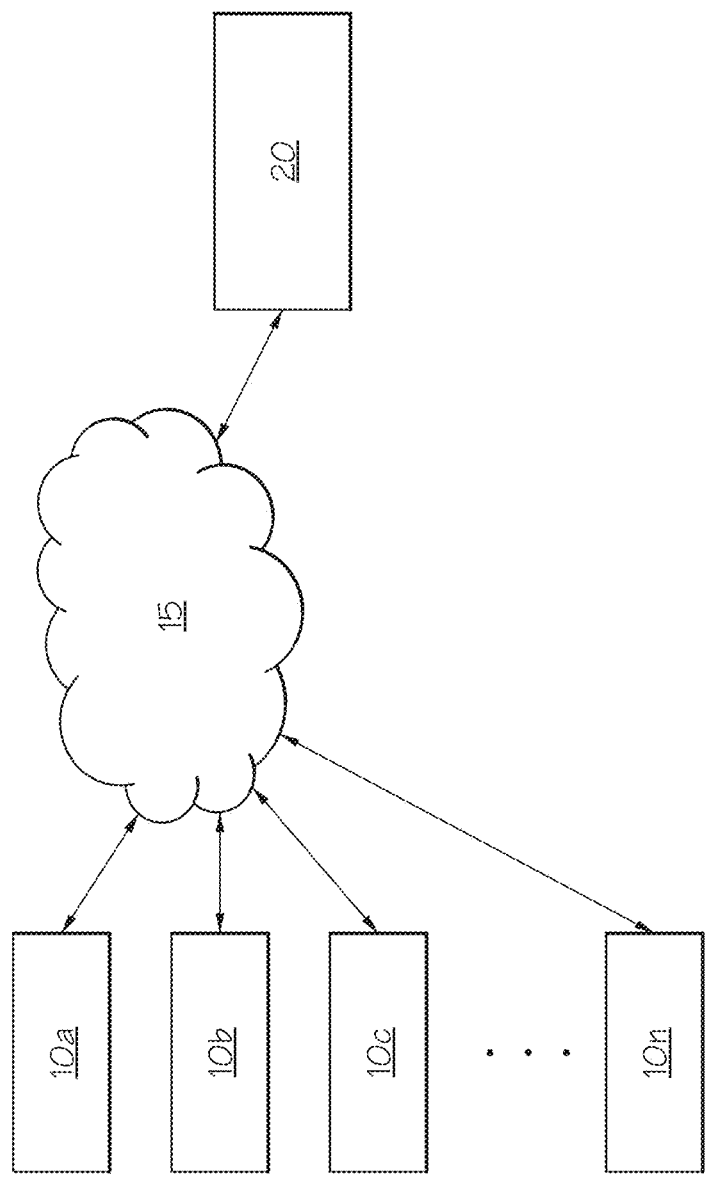

FIG. 7

METHODS FOR EVALUATING TERM SUPPORT IN PATENT-RELATED DOCUMENTS

CROSS REFERENCE TO RELATED APPLICATIONS

This application is a continuation-in-part of U.S. patent application Ser. No. 14/323,501 filed on Jul. 3, 2014, and entitled "Methods for Evaluating Term Support in Patent-Related Documents", which is a continuation of PCT/US13/76160 filed on Dec. 18, 2013, and entitled "Systems and Methods for Patent-Related Document Analysis and Searching", which claims priority to U.S. Provisional Patent Application No. 61/880,449 filed on Sep. 20, 2013, and entitled "Systems and Methods for Patent-related document Analysis and Image Searching", and U.S. Provisional Patent Application No. 61/738,703 filed on Dec. 18, 2012, and entitled "Systems and Methods for Searching Documents and Related Images". The entire content of each of the foregoing applications is incorporated herein by reference in their entireties.

TECHNICAL FIELD

The present disclosure generally relates to the field of computerized systems. More particularly, disclosed embodiments relate to computerized systems and methods for patent-related document analysis and image searching.

BACKGROUND

Various databases and tools exist for patent-related documents, such as those provided by the U.S. Patent and Trademark Office and foreign patent agencies. Other search tools also include MicroPatent™, PatBase™, and Delphion™. These search tools may permit users to search for patent-related documents using search terms and other criteria.

Traditional search tools, however, are often limited in their ability to search, filter, and analyze large numbers of patent-related documents. While traditional search tools may locate large numbers of patent-related documents responsive to a query, they do not provide an effective user interface for filtering and analyzing the patent-related documents to find documents of interest to a user. Traditional search tools also do not allow a user to search for particular patent drawings of patent documents, which may assist a user in finding relevant patent-related documents.

Further, existing patent-related document tools do not enable a user to verify if there is support for claim terms that are present in claims. For example, the Detailed Description of the patent-related document may use different terminology than a particular claim term. Although the claim term may not have literal support, it may have non-literal support in the form of term variants in the Detailed Description. Accordingly, there exists a need for improved search and analysis tools for patent-related documents.

SUMMARY

In one embodiment, a method of automatically determining whether a term located in a claims section of a patent document has non-literal support in a patent-related document includes receiving, from a client device, a search query, accessing, by a patent analyzing device, a document corpus in response to receiving the search query, displaying, on the client device, a list of terms appearing in the patent-related document and displaying, on the client device, a graphical representation of a literal support status for each term within the list of terms, wherein the literal support status indicates literal support is or is not present within a specification of the patent-related document. The method further includes upon receiving, by the client device, a selected term from the list of terms appearing in the specification of the patent-related document, accessing a memory or a database of the patent analyzing device to determine a plurality of acceptable part name candidates, paring, by the patent analyzing device, the plurality of acceptable part name candidates into a plurality of variants, generating, by the patent analyzing device, one or more variant suggestions related to the selected term from the plurality of variants and transmitting the one or more variant suggestions to the client device and displaying, by the client device, the one or more variant suggestions. Further, the method includes receiving one or more selected variant suggestions from the one or more variant suggestions, associating the one or more selected variant suggestions with the selected term, and displaying, on the client device, a graphical representation of an association between the selected term and the one or more selected variant suggestions, wherein the association is indicative of non-literal support for the selected term, wherein a graphical interface presents, in an integrated single display adjacent to the patent related document, the graphical representation of the literal support status for each term within the list of terms, the one or more variant suggestions, and the graphical representation of the association between the selected term and the one or more selected variant suggestions.

In another embodiment, a method of automatically determining whether a term located in a claims section of a patent document has non-literal support in a patent-related document includes receiving, from a client device, a search query, accessing, by a patent analyzing device, a document corpus in response to receiving the search query, displaying, on the client device, a list of terms appearing in a first patent-related document and a second patent-related document, and displaying, on the client device, a graphical representation of whether individual terms in the list of terms appear in a specification of the first patent-related document or in a specification of the second patent-related document. The method further includes upon receiving, by the client device, a selected term from the list of terms, wherein the selected term does not appear within the first patent-related document or the second patent-related document, accessing, a memory or a database of the patent analyzing device to determine a plurality of acceptable part name candidates, paring, by patent analyzing device, the plurality of acceptable part name candidates into a plurality of variants, generating, by the patent analyzing device, one or more variant suggestions related to the selected term from the plurality of variants and transmitting the one or more variant suggestions to the client device, and displaying, by the client device, one or more variant suggestions related to the selected term. Further, the method includes receiving one or more selected variant suggestions from the one or more variant suggestions, associating the one or more selected variant suggestions with the selected term, and displaying, on the client device, a graphical representation of an association between the selected term and the one or more selected variant suggestions, wherein the association is indicative of non-literal support for the selected term, wherein the first patent related document and the second patent related document are in a same family of patent related documents, wherein a graphical interface presents, in an integrated single display adjacent to the patent related document, the graphical representation of whether individual terms in the list of terms appear in the specification of the first patent-related document or the specification of the second patent-related document, displays one or more variant suggestions related to the selected term, and displays the graphical representation of the association between the selected term and the one or more selected variant suggestions.

In yet another embodiment, a method of automatically determining whether a term located in a claims section of a patent document has non-literal support in a patent-related document includes receiving, from a computing device, a search query, accessing, by a patent analyzing device, a document corpus in response to receiving the search query, displaying, on the client device, a list of terms appearing in the patent-related document, and displaying, on the client device, a graphical representation of a literal support status for each term within the list of terms, wherein the literal support status indicates literal support is or is not present within a specification of the patent-related document. The method further includes upon receiving, by the client device, a selected term from the list of terms not appearing in the specification of the patent-related document, accessing a memory or a database of the patent analyzing device to determine a plurality of acceptable part name candidates, paring, by the patent analyzing device, the plurality of acceptable part name candidates into a plurality of variants, generating, by the patent analyzing device, one or more variant suggestions related to the selected term from the plurality of variants and transmitting the one or more variant suggestions to the client device, and displaying, by the client device, the one or more variant suggestions related to the selected term. Further, the method includes receiving one or more selected variant suggestions from the one or more variant suggestions, associating the one or more selected variant suggestions with the selected term, and displaying, on the computing device, a graphical representation of an association between the selected term and the one or more selected variant suggestions, wherein the association is indicative of non-literal support for the selected term, wherein a graphical interface presents, in an integrated single display adjacent to the patent related document, the graphical representation of the literal support status for each term within the list of terms, the one or more variant suggestions, and the graphical representation of the association between the selected term and the one or more selected variant suggestions.

BRIEF DESCRIPTION OF THE DRAWINGS

FIG. 1 schematically depicts an illustrative network of devices that are used to evaluate terms in patent-related documents according to one or more embodiments described and illustrated herein;

FIG. 7 illustrates an exemplary graphical interface for evaluating claim terms of a patent-related document according to one or more embodiments described and illustrated herein;

DETAILED DESCRIPTION

Figure 2A:
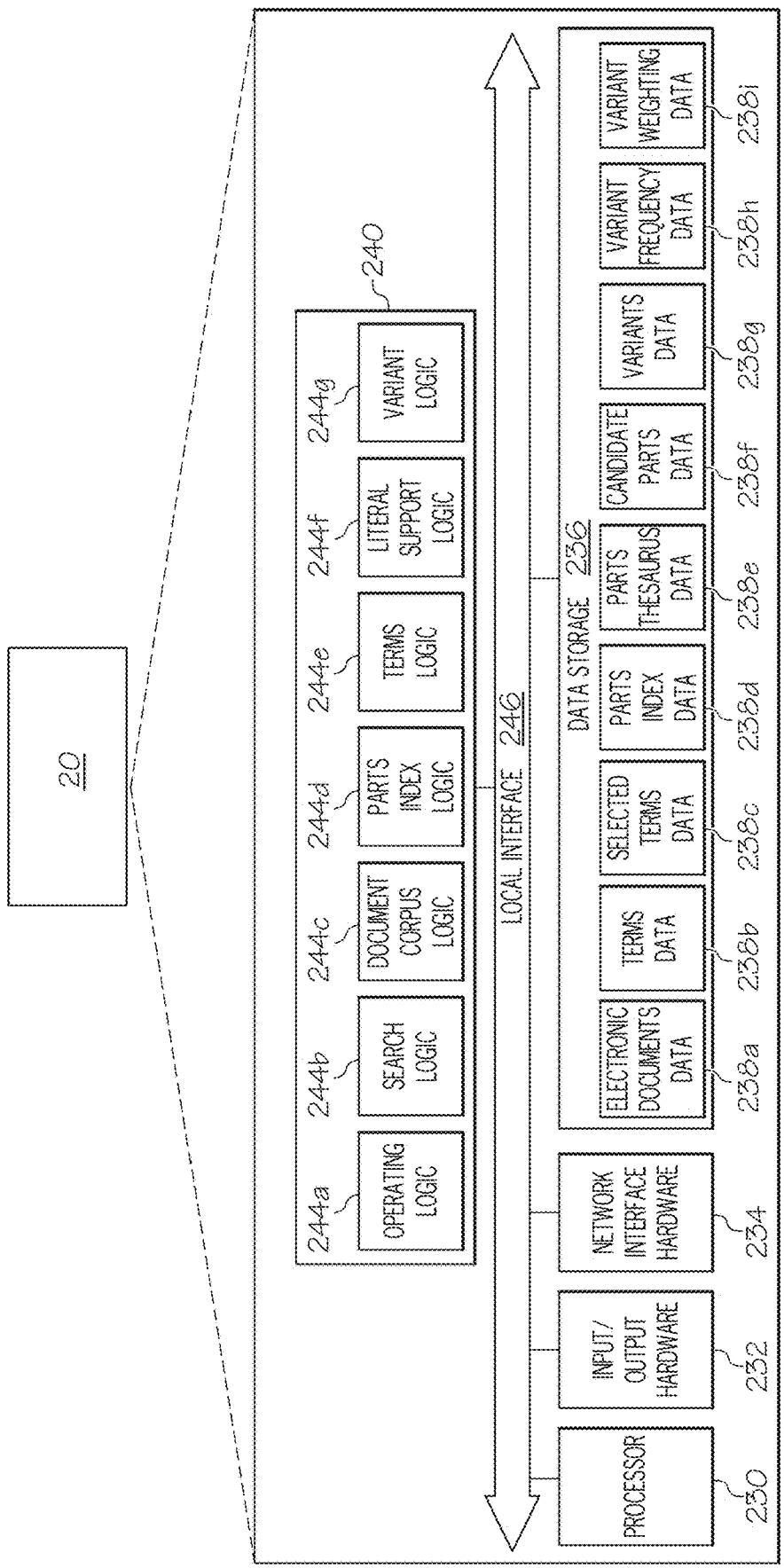
FIG. 2A schematically depicts an illustrative patent analyzing device, further illustrating hardware and software components that are used to evaluate terms in patent-related documents according to one or more embodiments described and illustrated herein.

Embodiments of the present disclosure are directed to systems and methods for identifying, aggregating, indexing, conceptually interrelating and searching patent part expressions and their related drawings for enabling effective exploration of one or more part expressions and text-to-image and image-to-image patent prior art searching. Embodiments are also directed to systems and methods for indicating conceptual support in a specification of a patent-related document for terms within claims of the patent-related document that do not have literal support in the specification. Further, embodiments are also directed to systems and methods for indicating conceptual support for a term in one or more compared documents when the exact term does not appear in the one or more compared documents.

Patents and patent applications generally include at least a claims portion and a specification portion. The claims portion is a set of particularly crafted sentences that explicitly define the limits of the patent or patent application (i.e., what the patent or patent application does and does not cover). The specification portion of the patent or patent application, which may also be referred to as the disclosure, generally encompasses the remainder of the patent or patent application and provides a detailed explanation of what is in the claims, defines the scope of the claims, illustrates items within the claims, provides various embodiments, and generally provides a concise explanation of an invention in such a manner that a person having ordinary skill in the art can understand the claims. In some jurisdictions, it may be necessary for the specification to have literal support for terms that are present in the claims. That is, claim terms must be explicitly included and defined within the specification. However, in other jurisdictions, it may not be necessary to have literal support for terms used in the claims. For example, the United States Patent and Trademark Office Manual of Patent Examination and Procedure (MPEP) states at section 2163.02 thereof that "the subject matter of the claim need not be described literally (i.e., using the same terms or in haec verba) in order for the disclosure to satisfy the description requirement." Rather, a specification that describes claim terms using terms that are conceptually similar to the terms used in the claims and adequately explain the terms used in the claims is considered to provide support for the claim terms without providing literal support.

Traditionally, computer users are limited in the way that they can craft patent applications to ensure that the claims contain support within a specification and/or search existing patents or applications for claim support, aside from executing a search function that looks for literal support. That is, existing computer systems merely allow a user to search for the exact words or phrases within claims to see if those words or phrases are present in a specification. This is completed when a user executes a search function in a word processor or other program and types the term or phrase used in a claim. The results returned after executing the search function merely show locations where the exact word or phrase were found. In patents and applications where non-literal support for a word or phrase in a claim exists (but no literal support exists), the user would not be able to use the computer to find such support. Rather, it would be incumbent upon the user to determine possible alternative words or phrases and search each of these alternative words or phrases individually. This can be a time consuming and inaccurate process, particularly in instances where the user is unaware of certain words or phrases for a particular claim term that may be used. Moreover, vernaculars are constantly evolving and alternative meanings of claim terms are devised on a regular basis, particularly in the patent world where patent professionals are encouraged to be their own lexicographers. As such, the specialized systems and methods described herein are particularly configured to determine whether a claim term has non-literal support in an accompanying specification or in other sources incorporated by the specification while at the same time accounting for a fluid vernacular in a manner that could not be achieved by an individual person. In addition, the systems and methods described herein provide a particular improvement in the way that data is collected and analyzed for patents and patent applications.

Embodiments disclosed herein provide systems and methods for searching a parts thesaurus for search term variants corresponding to search terms. As described in more detail below, the parts thesaurus may be generated using various information included in a corpus of documents. Consistent with disclosed embodiments, the parts thesaurus may be used, inter alia, to analyze one or more documents in the corpus of documents. The following discussion may refer to various legal documents, such as patent-related documents (for example, patents and published patent applications). However, one of ordinary skill in the art will understand that systems and methods consistent with the disclosed embodiments may analyze any type of document.

As used in the context of patent-related documents, a "part" may refer to a component of an invention described in a patent-related document. For example, a part may be component of a drawing reference, which may include both the part expression (i.e., part name) and an identifier, such as a reference number (or a part number). A "claim element" (or "claim term") may refer to a component of an invention included in a claims section of a patent-related document. In general, terms such as "phrase," "component," "part," "element," "term," and the like, may refer to any word or set of words in a document.

Generally, embodiments utilize a comprehensive patent-based parts index (millions of discrete part expressions) derived exclusively from the U.S. patent corpus, although sources other than the U.S. patent corpus may be used to derive the parts index (e.g., a PCT parts index, EPO parts index, Canadian parts index, etc.). It should be appreciated that the U.S. patent corpus, or other sources, is a live corpus in which the documents within the corpus are dynamic (e.g., constantly updated), which causes the patent-based parts index to also be dynamic or change based on the corpus. The parts index includes part variant relationships derived from the patent text that conceptually interrelate part expressions (i.e., part names) enabling users to identify useful language variants for formulating queries, generating analytics, or identifying patents covering similar parts or other numbered items appearing in patent drawings (e.g., parts, flowcharts, symbols, graphs, etc.). By retaining the "bibliographic parentage" of the various parts data, the parts index may be used to pinpoint patents having meaningful structure with specific user desired attributes.

Conceptually related part variants within the parts index define a parts thesaurus. Part variants (i.e., synonyms) may be generated based upon the co-occurrence (i.e., pairings) of any part labels/numbers appearing within a single part reference, as across a series of patent-related documents. These variants are provided in the parts thesaurus, which may be accessed for query expansion, for example.

Various aspects of the parts index, determining and sorting variants using the parts index, parts thesaurus, and text-to-image searching are described in U.S. Pat. Publ. No. 2011/0307499 entitled "Systems and Methods for Analyzing Patent Related Documents" filed on Jun. 11, 2010.

More specifically, the parts thesaurus comprises consolidated part reference data (from the parts index), wherein part variants (particularly synonyms) are generated based upon the co-occurrence (pairings) of any part labels appearing within a single part reference, as across a series of patents. For those pairings occurring only once, or having the same number of matches, the number of patents containing both synonyms of the pair (as within a single figure description (ideal) or as across a patent) are utilized for ranking.

Another approach of grouping parts in the part reference data as parts thesaurus entries is to group all part phrases that have the same last word and that appear in a minimum number of patents. For example, the parts "door," "front door," and "back door" may be grouped together as an entry in the parts thesaurus, provided each was found in a minimum number of patents.

Yet another approach of grouping parts in the part reference data as parts thesaurus entries is to group parts that have the same part number but no common words together. For example, if a patent-related document contains "hole 10" and "opening 10," these may be grouped as a thesaurus entry because they share no common words. If a patent-related document contained "front door 15" and "back door 15," these would not be grouped together because both parts contain the word "door."

In all of the above-described instances, a threshold may be set to pare down the acceptable part name candidates into variants based on frequency (e.g., more than x-number of patent-related documents are needed to render the candidate acceptable).

Derived part variants that do not exist separately in a patent-related document may be generated by breaking existing part phrases into individual parts of speech and then selectively removing modification tokens (e.g., if a patent-related document only recites "horizontal cylindrical filter," embodiments may construct "horizontal filter," "cylindrical filter," and "filter" as other part phrases for the same patent-related document).

Additionally, weighting may be applied to the strength of the synonym bond using term frequency-inverse document frequency, which enables the presentation of the variants to be made based on most-to-least applicable. Articles, prepositions, adjectival noise words (such as right, left, top, bottom, front, back, etc.) may be excluded as noise words in the parts thesaurus if desired. These excluded terms may be captured into a parallel index and clustered via selectable qualifiers (e.g., spatial indicators, physical property indicators, etc.), each clustered variant then having their own related variants. Thus, if a user wishes to retrieve or distinguish particular parts utilizing common qualifiers, this could be done using the variants from the parallel index in combination with the variants from the parts index.

Embodiments as described herein provide a live patent corpus having a plurality of patent-related documents that is continuously updated. In addition, embodiments described herein provide a parts index that is generated and continuously updated to reflect the patent-related documents within the continuously-updated patent corpus. As such, the systems and methods described herein actively access a database or memory components to continuously determine any changes and/or updates to the parts index based on the patent-related documents within the patent corpus.

As described below, embodiments provide for text-to-image and image-to-image searching. Embodiments enable users to enter a part expression, or a combination of part expressions, and retrieve back a comprehensive image answer set that can be sorted and filtered utilizing common bibliographic data. If an image (i.e., a drawing of a patent-related document) of particular interest is identified, users may initiate a "more like this image" function to retrieve images that are similar to the selected image. Resultant answer sets may be available for further analysis and processing. Accordingly, users are able to quickly retrieve, browse, filter and identify patents having desired points of structure or illustrated concepts, rendering their research far more efficient, productive and thorough.

Embodiments of the present disclosure also utilize the parts index and related parts thesaurus to assist users in identifying non-literal support of one or more terms in either a single patent-related document or between compared documents. Users may desire to determine if there is support for a claim term within the specification (e.g., the Detailed Description section) of a patent-related document. Literal support means that the exact term or phrase used in the claims is recited in the corresponding specification or disclosure. For example, the claim term "cell phone" may have literal support in the specification when the phrase "cell phone" is recited and used in the Detailed Description section of the patent-related document. In some instances, literal support may not be found for one or more claim terms or phrases. However, there may be conceptual support for claim terms or phrases where there is not literal support. Non-literal, conceptual support is present when a variant of a term or phrase is used in the specification or disclosure rather than the exact term or phrase. For example, the phrase "mobile phone" may be a variant of "cell phone" as provided by the parts thesaurus. Accordingly, non-literal, conceptual support for the phrase "cell phone" appearing in the claims of a patent-related document may be present when the phrase "mobile phone" is used in the Detailed Description section.

Another example includes the claim term "forming concrete members," wherein the word "forming" may not have literal support in the corresponding disclosure. In this case, variants of the word "forming" found in the disclosure, such as "manufacturing" or "casting," may provide non-literal support for the claim term. Moreover, variants may be analyzed to determine the scope of each variant relative to the claim term. Referring to the above example, the variant "manufacturing" may be determined to be broader in scope than the word "forming" included in the claim term, whereas the variant "casting" may be determined to be narrower in scope.

Similarly, embodiments may assist a user that is interested in determining if there is literal or non-literal support for a term or phrase appearing in a first document provided in a compared document (or multiple compared documents). For example, a user may be interested to see if there is support for a claim term in a provisional patent with respect to an issued patent claiming priority to the provisional patent. In another example, an issued patent may be compared with a patent publication. As described above, variants of terms/phrases may be utilized to determine if there is non-literal, conceptual support in compared documents (e.g., non-literal, conceptual support for "cell phone" when the phrase "mobile phone" appears in a compared document).

As stated above, text-to-image searching may be performed consistent with disclosed embodiments. Generally, parts information found in patent drawings may be extracted and stored, in association with respective drawings, into a database or index. Text queries, for example, search queries received from a user, may then be matched against the stored parts information in the parts index to retrieve drawings containing parts information corresponding to a text query. Further, image-to-image searching is also provided in some embodiments, wherein drawings similar to one or more drawings may also be retrieved. Parts information associated with a first drawing may be compared with parts information associated with a second drawing. Based on one or more such comparisons, drawings determined to be similar to an initial set of drawings may be retrieved.

FIG. 1 is a diagram schematically illustrating an exemplary system that may be used to implement disclosed embodiments, including exemplary system components. The components and arrangement, however, may vary. For example, clients 10a-10n (collectively referred to as clients 10), network 15, and patent analyzing device 20 may be implemented in various ways. Clients 10, which are configured as computing devices, may each include one or more general purpose computers, mobile phones, or any handheld devices capable of communication over a network. Network 15 may include a local area network ("LAN"), a mobile communications network, a public service telephone network (PSTN) a personal area network (PAN), a metropolitan area network (MAN), a virtual private network (VPN), or other network that is a portion of a larger network or system of networks (e.g., an enterprise network). Network 15 may also include a wide area network (WAN), such as the Internet. Patent analyzing device 20 may include a plurality of servers and/or other networking devices.

Clients 10 and patent analyzing device 20 may include combinations of hardware and/or software configured consistent with the teachings presented herein. For example, clients 10 and patent analyzing device 20 may include one and/or more processors or microprocessors. Likewise, clients 10 and patent analyzing device 20 may include one or more volatile or non-volatile, magnetic, semiconductor, tape, optical, removable, nonremovable, or other type of storage device or computer-readable medium. The computer-readable medium may store instructions that, when executed, cause the one or more processors and/or microprocessors to perform functions consistent with disclosed embodiments. Further, clients 10 and patent analyzing device 20 may also be configured with an operating system (not shown), for example, Microsoft Windows™, Unix™, Linux™, Solaris™, and Apple OS X™. The choice of operating system, and even to the use of an operating system, is not critical to any embodiment. It should also be understood that embodiments described herein may be performed using a single client device without the use of a network or patent analyzing device.

The clients 10 may each generally be a device that is particularly arranged and configured to provide an interface between a user and the other components connected to the network 15. Thus, the clients 10 may be used to perform one or more user-facing functions, such as receiving one or more inputs from a user or transmitting data or information such as data related to initiating an electronic search query for evaluating a term in patent-related documents, as described in greater detail herein with respect to FIG. 2B.

The patent analyzing device 20 may generally be a particularly arranged and configured device that searches a document database using one or more terms and/or phrases to identify a result set of documents, establishes a parts thesaurus, determine candidate parts, and/or determine potential variants by frequency and/or weighting to identify variants related to the result set of documents that is indicative of a particular keyword or phrase searched on the clients 10. It should be appreciated that the document database is dynamic and that the patent analyzing device 20 continuously completes the processes described herein, in real-time, such that the parts thesaurus, the candidate parts, and/or the potential variants are continuously updated to account for the dynamic changing of vernacular. The patent analyzing device 20 may also be particularly configured to transmit information to at least the at least one client 10a of the clients 10 such that the client 10a displays the result of variant suggestions, literal support status, and/or the like pertaining to the result set of documents. It should be appreciated that the variant order maybe sorted and displayed in a plurality of combinations including in an inverse number (high to low based on occurrences), alphabetically, by part expression number, and/or the like. The components and functionality of the patent analyzing device 20 will be set forth in detail below.

Further, it should be understood that the clients 10 and in particular the client 10a may be a personal computer and the patent analyzing device 20 may be a server. However, these are merely examples. More specifically, in some embodiments, any type of client device (e.g., mobile computing device, personal computer, server, and the like) may be utilized for any of these components. Additionally, while each of these client devices is illustrated in FIG. 1 as a single piece of hardware (i.e. the at least one client 10a of the clients 10 and the patent analyzing device 20), this is also an example. More specifically, the clients 10 and the patent analyzing device 20 may represent a plurality of computers, servers, databases, and the like.

It should be understood that while the embodiments depicted herein refer to a network of client devices, the present disclosure is not solely limited to such a network. For example, in some embodiments, the various processes described herein may be completed by a single client device, such as a non-networked client device or a networked client device that does not use the network to complete the various processes described herein.

FIG. 2A depicts the patent analyzing device 20, further illustrating a system that evaluates a term or a phrase in patent-related documents by utilizing hardware, software, and/or firmware, according to embodiments shown and described herein. The patent analyzing device 20 may include a non-transitory, computer readable medium configured for searching a document corpus or identifying text in which searched the term or phrase appears and/or a variant of the searched term or phrase embodied as hardware, software, and/or firmware, according to embodiments shown and described herein.

In embodiments, the patent analyzing device 20 is configured as a special purpose computer designed specifically for performing the functionality described herein. For example, the patent analyzing device 20 may be a specialized device that particularly determines a parts index and/or thesaurus based on keywords, terms, and/or phrases located within the text of the patent-related documents within the document corpus. In a further example, the patent analyzing device 20 may be a specialized device that further searches a plurality of patent-related document text of each of the patent related documents to ascertain a plurality of parts index that may be used to populate a thesaurus, a plurality of candidate words data, and/or a plurality of variants of the parts index or a particular key terms or phrases from specific areas of text of the patent-related document, such as the Claims section, and generates a data list having the key terms, a data list of the from the plurality of candidate words data, and/or a data list of the plurality of variants. The patent analyzing device 20 is continuously searching the plurality of patent-related document text of each of the patent related documents to continuously ascertain and/or update the plurality of parts index, which in turn continuously populates the thesaurus, the plurality of candidate words data, and/or the plurality of variants of the parts index and/or the particular key terms or phrases from specific areas of text of the patent-related document to account for the ever changing vernacular.

The patent analyzing device 20 then provides the generated data list to an external component (e.g., the at least one client 10a of the clients 10 (FIG. 1)) for the purposes of improving user searching functionality by improving how a computer collects information and provides a user with improved functionality for determining whether particular key terms or phrases from specific areas of text of the patent-related document, such as the Claims section, have literal and/or nonliteral support in the specification.

As also illustrated in FIG. 2A, the patent analyzing device 20 may include a processor 230, input/output hardware 232, network interface hardware 234, a data storage component 236, and a memory component 240. The memory component 240 may be non-transitory computer readable memory. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to as one or more logic modules, such as, for example, operating logic 244a, search logic 244b, document corpus logic 244c, parts index logic 244d, terms logic 244e, literal support logic 244*f*, and variant logic 244*g* (each of which may be embodied as a computer program, firmware, or hardware, as an example). A local interface 246 is also included in FIG. 2A and may be implemented as a bus or other interface to facilitate communication among the components of the patent analyzing device 20. It should be understood that the processor 230, memory component 240 and various logic modules such as search logic 244*b*, document corpus logic 244*c*, parts index logic 244*d*, terms logic 244*e*, literal support logic 244*f*, and variant logic 244*g* may define a computer-program product for evaluating a term in patent-related documents.

The processor 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the patent analyzing device 20 and may be configured to store one or more pieces of data for access by the patent analyzing device 20 and/or other components, determine the parts index, parts thesaurus, and/or variant suggestions and/or determine whether selected terms or variant suggestions have literal and/or nonliteral support status in the specification. As illustrated in FIG. 2A, the data storage component 236 stores a database of electronic documents data 238*a*. As mentioned above, the electronic documents may include patent-related documents (i.e., patent, publications, non-patent literature, and/or the like) that have been organized and indexed for searching. The terms data 238*b* stores potential terms or phrases that may be used in the claims section of a particular patent-related document. For example, claims sections contain several terms or phrases that may be mined and these terms and phrases may then be stored in the terms data 238*b*. The selected terms data 238*c* may be terms specifically selected by the user from the terms data. Further, the selected terms data 238*c* may include data relating to whether or not there is literal support status for the selected term.

The parts index data 238*d* includes a plurality of data, such as part variant relationships derived from the patent text that conceptually interrelate part expressions (i.e., part names) enabling users to identify useful language variants for formulating queries, generating analytics, or identifying patents covering similar parts or other numbered items appearing in patent drawings (e.g., parts, flowcharts, symbols, graphs, etc.). The parts thesaurus data 238*e* includes consolidated part reference data (from the parts index), wherein part variants (particularly synonyms) are generated based upon the co-occurrence (pairings) of any part labels appearing within a single part reference, as across a series of patents. The candidate parts data 238*f* may include a plurality of potential part name candidates that may associate with the selected term. The variants data 238*g* includes a plurality of variants of the selected term derived from the candidate parts data 238*f* based on frequency and/or weighting applied to the strength of the candidate terms. Further, the variants data 238*g* may include data relating to whether literal support exists for the variant term or phrase. The variant frequency data 238*h* may store a plurality of thresholds that determine when to pare down the acceptable part name candidates into variants based on frequency (e.g., more than x-number of patent-related documents are needed to render the candidate acceptable). The variant weighting data 238*i* is data relating to displaying the variant suggestions. For example, a synonym bond using term frequency-inverse document frequency that enables the presentation of the variants to be made based on most-to-least applicable.

Included in the memory component 240 are the operating logic 244*a*, search logic 244*b*, document corpus logic 244*c*, parts index logic 244*d*, terms logic 244*e*, literal support logic 244*f*, and variant logic 244*g*. The operating logic 244*a* may include an operating system and/or other software for managing components of the patent analyzing device 20. The search logic 244*b* may contain programming instructions to facilitate electronic searches during a data generation process as described in greater detail herein. Further, the search logic 244*b* may contain programming instructions to mine the electronic documents for terms and/or phrases used in a Claims section. The search logic 244*b* may transmit data to the search computer (i.e., the client 10*a*) so that the search computer knows which terms are found in various patent-related documents and/or variants of the terms found in the Claims section and/or in the patent-related documents within the document corpus. As such, the search computer (i.e., the client 10*a*) has information that triggers the search computer to display the list of terms and variants of those terms when reviewing the results list.

The document corpus logic 244*c* may contain programming instructions to sort, store, categorize, and/or the like a plurality of patent-related documents relating to the terms mined from the patent-related document (i.e., the terms data 238*b*) so to establish a document corpus in the electronic documents data 238*a*. The document corpus logic 244*c* may continuous search for patent-related documents to store in the electronic documents data 238*a*. As such, the document corpus logic 244*c* may constantly update the electronic documents data 238*a* such that the document corpus is dynamic. The parts index logic 244*d* may contain programming instructions to identify a plurality of parts and part variant relationships derived from the patent text that conceptually interrelate part expressions (i.e., part names) enabling users to identify useful language variants for formulating queries, generating analytics, or identifying patents covering similar parts or other numbered items appearing in patent drawings (e.g., parts, flowcharts, symbols, graphs, and/or the like.) and storing the plurality of parts in the parts index data 238*d*. The parts index logic 244*d* may be an algorithm configured to establish the parts thesaurus, which includes consolidated part reference data from the parts index, and configured to generate part variants (particularly synonyms) based upon the co-occurrence (pairings) of any part labels appearing within a single part reference, as across a series of patents and stored in the parts thesaurus data 238*e*. Further, the parts index logic 244*d* may be configured to establish a candidate parts list having a plurality of potential part name candidates that may associate with the selected term and stored in the candidate parts data 238*f*.

The terms logic 244*e* may contain programming instructions to identify the terms and/or phrases of the Claims section by searching and mining the terms and storing the terms in the selected terms data 238*c*. The literal support logic 244*f* may contain programming instructions to determine whether the terms or phrases of the selected terms data 238*c* and/or the selected terms data 238*c* have literal support and/or nonliteral support within the specification of the patent-related document. The variant logic 244*g* may contain programming instructions to determine variants of the selected terms data 238c and/or the selected terms data 238c and stores the variants as the variants data 238g. The variant logic 244g may be an algorithm configured to determine the variants of the selected term derived from the candidate parts data 238f based on a frequency and/or a weighting applied to the strength of the candidate terms. The algorithm of the variant logic 244g may pare down the acceptable part name candidates into variants based on a plurality of threshold frequencies (e.g., more than x-number of patent-related documents are needed to render the candidate acceptable). Further, the algorithm of the variant logic 244g may apply a weighting factor of the variant weighting data 238i relating to the order of displaying the variant suggestions. For example, a synonym bond using term frequency-inverse document frequency that enables the presentation of the variants to be made based on most-to-least applicable.

It should be understood that the components depicted in FIG. 2A are merely illustrative and are not intended to limit the scope of this disclosure. More specifically, while the components in FIG. 2A are illustrated as residing within the patent analyzing device 20, this is a nonlimiting example. In some embodiments, one or more of the components may reside external to the patent analyzing device 20. Similarly, while FIG. 2A is directed to the patent analyzing device 20, other components such as the client 10a and the other clients 10 may include similar hardware, software, and/or firmware.

Figure 2B:
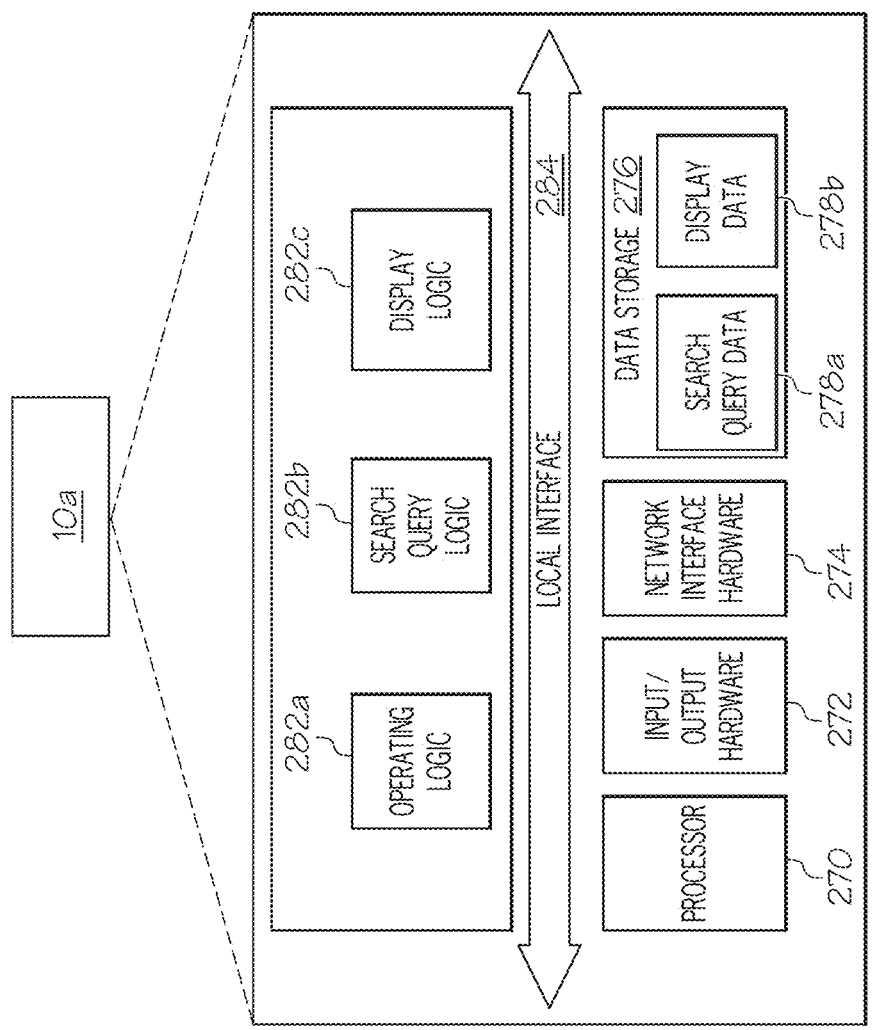
FIG. 2B schematically depicts a client device from FIG. 1, further illustrating hardware and software components that may be used to initiate a search query to identify one or more terms in patent-related documents according to one or more embodiments described and illustrated herein.

FIG. 2B depicts the at least one client 10a of the clients 10 further illustrating a system that identifies a search query by utilizing hardware, software, and/or firmware, according to embodiments shown and described herein. In addition, the client 10a may include a non-transitory, computer readable medium configured for displaying and transmitting a search query initiated by a user embodied as hardware, software, and/or firmware, according to embodiments shown and described herein.

While, in some embodiments, the client 10a may be configured as a general purpose computer with the requisite hardware, software, and/or firmware, in other embodiments, the client 10a may be configured as a special purpose computer designed specifically for performing the functionality described herein. For example, the client 10a may be a specialized device that displays a user interface for inputting a search query for at least search term of phrase and displays a plurality of generated results of the search query with the terms or phrases found in the Claims section and a plurality of terms and phrases found in the specification for the purposes of improving user searching functionality by improving how a computer collects information and provides a user with improved functionality for determining whether particular key terms or phrases from specific areas of text of the patent-related document, such as the Claims section, have literal and/or nonliteral support in the specification.

As also illustrated in FIG. 2B, the client 10a may include a processor 270, input/output hardware 272, network interface hardware 274, data storage component 276, which stores a database of search query data 278a and display data 278b, and a memory component 280. The memory component 280 may be non-transitory computer readable memory. The memory component 280 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 280 may be configured to store operating logic 282a, search query logic 282b, and display logic 282c (each of which may be embodied as a computer program, firmware, or hardware, as an example). A local interface 284 is also included in FIG. 2B and may be implemented as a bus or other interface to facilitate communication among the components of the client 10a.

The processor 270 may include any processing component(s) configured to receive and execute instructions (such as from the data storage component 276 and/or memory component 280). The input/output hardware 272 may include a monitor, keyboard, mouse, printer, camera, microphone, speaker, and/or other device for receiving, sending, and/or presenting data. The network interface hardware 274 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 276 may reside local to and/or remote from the client 10a and may be configured to store one or more pieces of data for access by the client 10a and/or other components, store data that may be received from an external device (e.g., the patent analyzing device 20) such as the search query data 278a, and/or store data to be displayed. As illustrated in FIG. 2B, the data storage component 276 stores a database of search query data 278a. As mentioned above, the search query data 278a may include data related to a searched term and/or phrase and/or data received from an external device (i.e., the patent analyzing device 20). The display data 278b may include data relating to the data to be displayed. For instance, the display data 278b may include the terms and/or variants thereof and whether literal or nonliteral support exists for the terms and/or variants to be displayed on the client 10a.

Included in the memory component 280 are the operating logic 282a, search query logic 282b, and display logic 282c. The operating logic 282a may include an operating system and/or other software for managing components of the client 10a. The search query logic 282b may contain programming instructions to facilitate user initiated electronic searches or queries. The search query logic 282b may be configured to compile, organize, and/or display electronic documents and/or terms and/or variants and the literal support status thereof. The search query logic 282b may also be configured to provide data for a user interface to or a display device of the client 10a.

The display logic 282c may display a graphical user interface usable by a user of the client 10a to provide electronic document search queries, to display visualizations of a plurality of terms and/or phrases associated with the claims of the patent-related document and whether the plurality of terms and/or phrases associated with the claims of the patent-related document have literal and/or nonliteral support in the specification. The graphical user interface useable by the user may further display a plurality of variants suggestions based on the user selected terms, and whether the plurality of variants associated with the selected terms have literal and/or nonliteral support in the specification and/or claims. The display logic 282c may generally be configured to display information on a display of the client 10a.

It should be appreciated that the at least one client 10a of the clients 10 and the patent analyzing device 20 assist users in identifying terms within patent-related documents, variants of the terms, and whether the terms and/or variants have literal and/or nonliteral support in the specification of patent related documents. More specifically, to perform an electronic search query, at least one client 10*a* of the clients 10 may present a user with a graphical user interface (GUI) that allows the user to enter one or more terms or phrases to be searched. The GUI interface may be configured to receive a search request from the user. A processor 270 (FIG. 2B) on the at least one client 10*a* of the clients 10 accesses a memory component 240 (FIG. 2A) and/or a data storage component 236 (FIG. 2A) on the patent analyzing device 20 to ascertain a part name candidate generated from the parts index. The GUI may display the part name candidates received from the memory component 240 (FIG. 2A) and/or the data storage component 236 (FIG. 2A), as described in greater detail herein. The search request may include terms and/or other data for determining whether the terms, other data, or variants of either the terms and/or other data are present in any of plurality of patent-related documents within the corpus. The functionalities of the operating logic 282*a*, the search query logic 282*b*, and the display logic 282*c* will be described in further detail below with respect to FIG. 4.

Figure 3A:
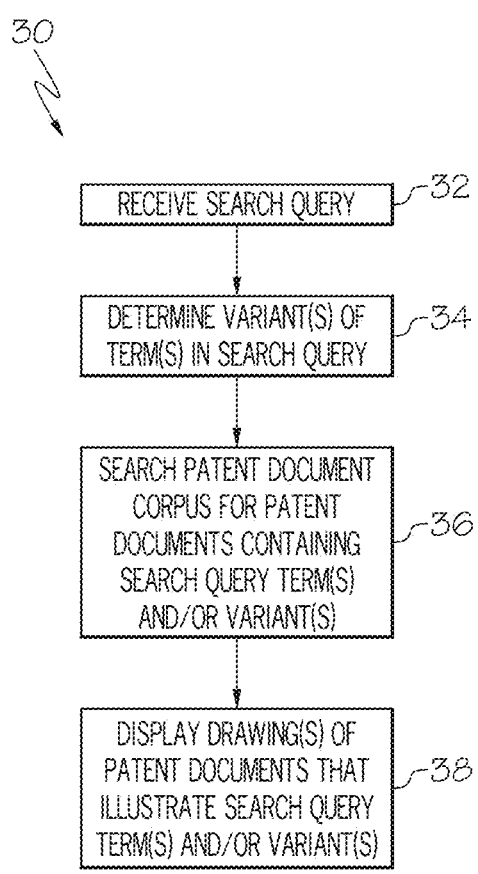
FIG. 3A is a flow chart depicting an exemplary process for text to image searching according to one or more embodiments described and illustrated herein.

It should be understood that the components depicted in FIG. 2B are merely illustrative and are not intended to limit the scope of this disclosure. More specifically, while the components in FIG. 2B are illustrated as residing within the client 10*a*, this is a nonlimiting example. In some embodiments, one or more of the components may reside external to the client 10*a*. Similarly, while FIG. 2B is directed to the client 10*a*, other components such as other clients 10 may include similar hardware, software, and/or firmware. Text-to-image searching of patent-related documents will now be described. Referring to FIG. 3A, a flow chart 30 depicting an exemplary process of text-to-image searching of patent-related documents is illustrated. Initially, a search query is received at block 32. The search query may be a traditional search query comprising one or more search terms (e.g., part names) entered into a text field by a user. The search query may also be provided by selection of one or more part names provided in a list. In some embodiments, search queries may be formulated by using Boolean logic, whereby part names may be utilized by Boolean operators such as "AND," "OR," "ANDNOT," etc. Once the search query is received, one or more variants are optionally obtained at block 34. The variants may be obtained by utilizing the parts thesaurus described above. For example, for a search query including the phrase "concrete anchor," variants such as "ground anchor," "expansion anchor," "anchor assembly" and the like may be returned. In some embodiments, the user may be enabled to select which variants he or she would like to have searched. In other embodiments, variants are not determined.

Next, patent-related documents are searched to surface patent-related documents containing the search query terms and/or variants of the search query terms at block 36. Because the parts index described above includes part names, associated part numbers, and bibliographic information, the parts index may be searched using the search query and/or variants to surface patent-related documents having drawings relevant to terms of the search query and/or their variants. For example, the parts index may be searched to locate drawings of patent-related documents that include part names and associated part numbers that correspond to the terms of the search query and/or their variants. Next, the relevant drawings may be displayed to the user in a graphical interface at block 38.

It is noted that filters may also be utilized to limit the drawings returned from the text search. Example filters include, but are not limited to, classification, inventor name, assignee name, and issue or publication date.

Figure 3B:
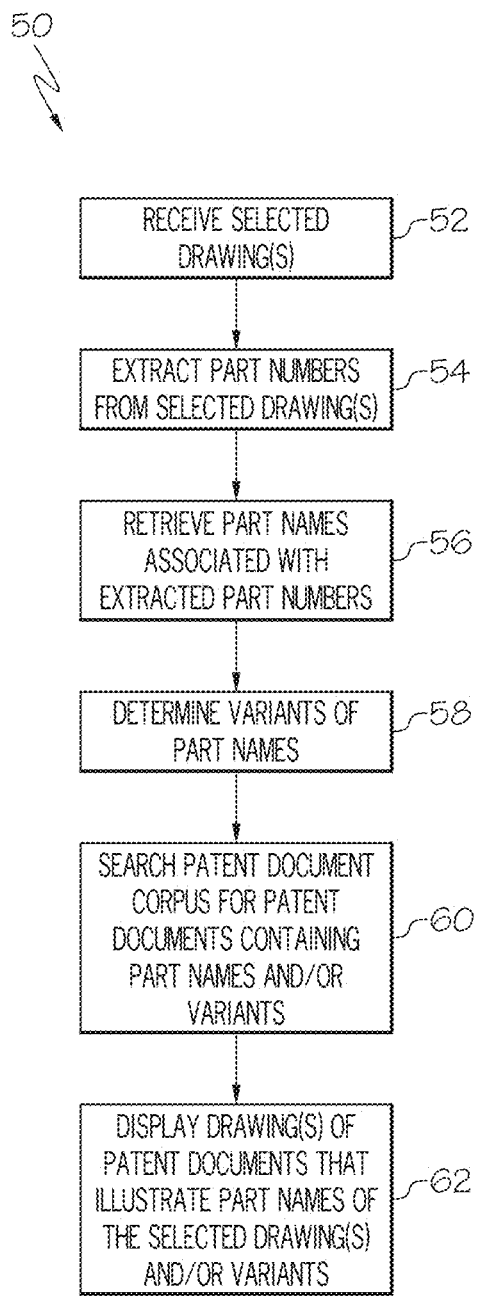
FIG. 3B is a flow chart depicting an exemplary process for image-to-image searching according to one or more embodiments described and illustrated herein.

Embodiments of the present disclosure also enable users to perform image-to-image searching wherein a patent drawing is used to search for similar patent drawings. Referring now to FIG. 3B, a flowchart 50 depicting an exemplary process for image-to-image searching is illustrated. At block 52 a drawing (or drawings), such as a patent drawing, is received. For example, a user may select a patent drawing that is presented in a graphical interface. Next, at block 54, the system extracts part numbers from the selected drawing. For example, optical character recognition may be utilized to detect and extract the part numbers from the selected drawing. The extraction process may be performed after receiving the selected drawing, or the selected drawing may have been pre-processed.

Next, the part names associated with the extracted part numbers are retrieved at block 56. As an example and not a limitation, an extracted part number "10" of the selected drawing may be associated with the phrase "concrete anchor" in the text of the patent-related document associated with the selected drawing. In this manner, the system determines all of the part names associated with the extracted part numbers of the selected drawing. In one embodiment, the parts index may be used to determine the part names associated with the part numbers. More specifically, the parts index includes bibliographic information (e.g., patent numbers and/or published patent application numbers) associated with the part names and part numbers stored therein. Accordingly, the parts index may be used to determine the part names for the numbers extracted from the selected drawing of a particular patent-related document.

In some embodiments, variants of the extracted part names may be determined at block 58. For example, the parts thesaurus described above may be accessed to determine the variants. The variants may be used for query expansion, for example. In other embodiments, variants are not determined.

At block 60, the patent-related document corpus is searched for drawings of patent-related documents containing the extracted part names and/or variants. More specifically, the extracted part names and variants, if utilized, are used as a search query to retrieve relevant patent-related documents. In some embodiments, the user may select which of the extracted part names and/or variants he or she would like to search. As an example and not a limitation, the user may choose to include the phrase "concrete anchor" but not the term "shaft" that was also extracted from the selected drawing.

In some embodiments, the patent-related document corpus may be searched by searching the parts index for the extracted part names and/or variants. Patent-related documents containing the extracted part names and/or variants (or some portion of the part names and/or variants) may be determined. The drawings of the returned patent-related documents containing the extracted part names and/or variants are determined and displayed to the user in a graphical interface at block 62. In this manner, a user may perform a "more like this image" to retrieve similar drawings from other patent-related documents within the corpus. Example filters may also be included to filter images, such as, but not limited to, classification, inventor name, assignee name, and issue or publication date.

Figure 4:
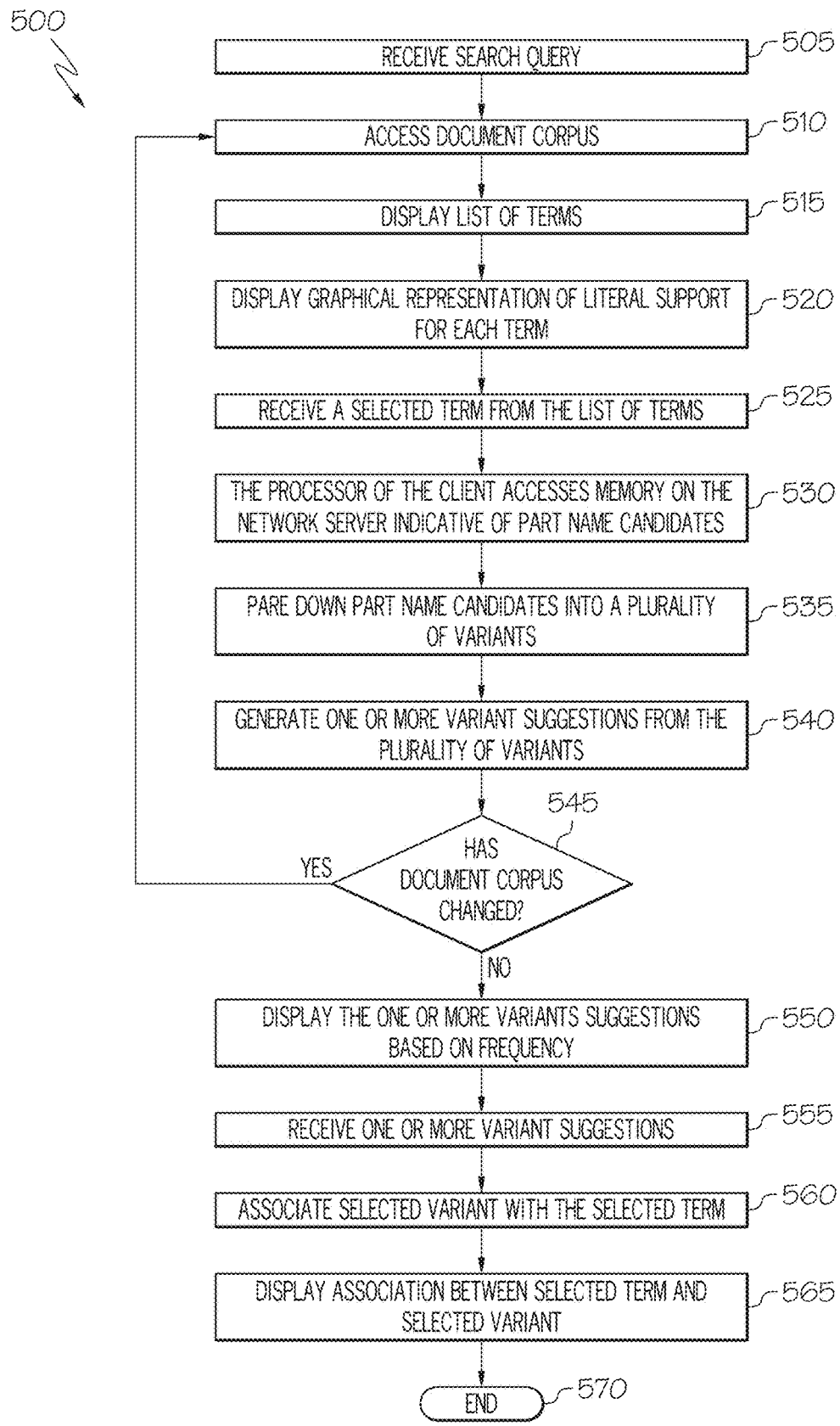
FIG. 4 depicts a flow diagram of an illustrative method of evaluating terms in patent-related documents according to one or more embodiments shown and described herein.

Referring now to FIG. 4, a flow diagram that graphically illustrates an illustrative method 500 of evaluating terms in patent-related documents according to one or more embodiments is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order. As a result of the processes described herein with respect to FIG. 4, data is generated that can be used by an external device (e.g., the client 10*a* (FIG. 1)) to complete one or more additional processes with the generated data (e.g., conduct a search and indicate whether literal and/or non-literal support exists in a selected term).

Still referring to FIG. 4, the system receives a search query at block 505. The search query may be generated at the client 10*a* or elsewhere. The system accesses, during the data generation process, all electronic documents from a corpus (e.g., a patent-related corpus) at block 510. The electronic documents may be obtained, for example, from a repository containing electronic documents (e.g., a patent-related documents repository). In some embodiments, such a repository may be local. For example, the electronic documents may be obtained from the electronic documents data 238*a* of the data storage component 236 (FIG. 2A) as described in greater detail herein. In other embodiments, the documents may be obtained from an offsite data storage repository, such as an electronic document publisher's repository (i.e. the United States Patent and Trademark Office) and/or the like. The documents are generally electronic documents and may generally contain information arranged in paragraph form. In some embodiments, the documents may be patent-related documents, such as, for example, patents and publications, generally including at least a claims portion and a specification portion. In other embodiments, the documents may be non-patent literature such as, for example, scientific journals, engineering publications, and/or the like.

The electronic documents are scanned to identify a list of terms found within the Claims section. At block 515, the list of terms is displayed. It should be appreciated that the list of terms may contain all the terms and/or phrases within the Claims section and displayed via the GUI. As such, once the plurality of terms are identified, a graphical representation of whether each term of the plurality of terms has literal support is displayed, at block 520, to identify whether the specification portion supports each term. That is, the patent analyzing device 20 (FIG. 1) is configured to determine whether a claim term has non-literal support in an accompanying specification or in other sources incorporated by the specification while at the same time the client 10*a* (FIG. 1) is configured to display via a GUI whether the claim term has literal support. It should be appreciated that each of the terms the plurality of terms in the claims may have both literal support and non-literal support within the specification portion. For example, while a term from the plurality of terms in the claims may have literal support in the specification portion, this support may only be a single instance and in multiple other instances, a variant of the term is used. As such, a user may still desire to find variants used even when there is literal support such that the system will identify all the variants for each term of the plurality of terms, as discussed in greater detail herein.

With reference to FIGS. 1, 2A-2B and 4, at block 525, a user may select a term from the plurality of terms. The selected term instructs the system to identify any variants of the selected term. In response, at block 530, the processor 270 of the client 10*a* accesses the memory component 240 and/or the data storage component 236 on the patent analyzing device 20 which is indicative of part name candidates.

The part name candidates may be one or more terms and/or phrases identified in the parts index of the document corpus that relate to the selected term or phrases, as described in greater detail above. It should be understood that the patent analyzing device 20 continuously searches and updates the document corpus and, with each new document, scans and stores the terms in the parts index to generate the thesaurus and the part name candidates, as discussed in greater detail below.

It should be appreciated that the processor 270 of the client 10*a* accessing the memory component 240) and/or the data storage component 236 on the patent analyzing device 20 and retrieving a part candidate word via the network 15 is akin to receiving the plaintext word signal at the first computer terminal, transforming the plaintext word signal to one or message block word signals and transmitting the encoded word signal to the second computer terminal over a communication channel.

At block 535, the part name candidates are pared down in a plurality of variants. The plurality of variants is associated, to some degree, with the selected term and is established by similar terms used in the document corpus as discussed in greater detail above. The part name candidates may be pared down by the patent analyzing device 20 (FIG. 1) to determine the plurality of variants by frequency and/or weighting, as discussed in greater detail above. At block 540, the system generates one or more variant suggestions from the plurality of variants. The one or more variant suggestions are directly related to the selected term such that the one or more variant suggestions may be found in the specification of the patent-related document.

At block 545, the system verifies whether the document corpus has changed. The document corpus logic 244*c* (FIG. 2A) may perform functions related to determining whether the corpus is modified. The corpus may be modified or changed by new or additional patent-related documents, non-patent literature, and/or the like. With the addition of new or updated patent-related documents, non-patent literature, and/or the like may modify the parts index and ultimately the variant suggestions. It should be understood that the processes described herein with respect to blocks 510-545 are completed continuously. For instance, if a prior document corpus did not include the term "cryptocurrency" but did include the term "electronic currency", the prior document corpus may updated with variants for the term "electronic currency". As such, when technology improves and/or new names are assigned, as discussed in greater detail above, the live document corpus may change, which modifies the parts index to include terms such as "cryptocurrency," "digital asset," "blockchain currency," and/or the like. If the document corpus logic 244*c* (FIG. 2A) determines that the document corpus has changed, at block 545, then the system returns to block 510 to access the updated document corpus. On the other hand, if the document corpus logic 244*c* (FIG. 2A) determines that the corpus has not changed, then the one or more variant suggestions are displayed to a user based on the frequency of the variant suggestion at block 550.

At block 555, the system receives one or more variant suggestions. The user may view the suggested variant suggestions and then may selected one or more variant suggestions. The selected one or more variant suggestions may be determined by the user based on a frequency found in the specification in which the system may place the highest frequency variant suggestions near the top of the displayed list, or the user may determine which one or more variant suggestion is most appropriate by other reasoning. At block 560, the selected variant is associated with the selected term such that, at block 565, the association between the selected term and the selected variant may be displayed. The association may be determining and displaying whether there is literal and/or non-literal support for the selected variant in the specification for the selected term from the Claims section. The method ends at 570 and may repeat each time a search query is received at block 505.

It should be appreciated that method 500 is directed to a particular improvement in how various client devices (e.g., computing devices) collect and display data with respect to patent documents. Specifically, the method 500 limits collection of data to a parts index related to terms and/or phrases found in the Claims section and ultimately to candidate terms and variant suggestions found in the patent-related document to determine whether the terms and/or variants have literal support in the specification. As such, the data collected is streamlined or limited such that there is a specific improvement over prior searching systems, particularly patent document searching systems, resulting in an improved computer providing a user with the tools for determining whether claims have nonliteral support in the specification.

Figure 5:
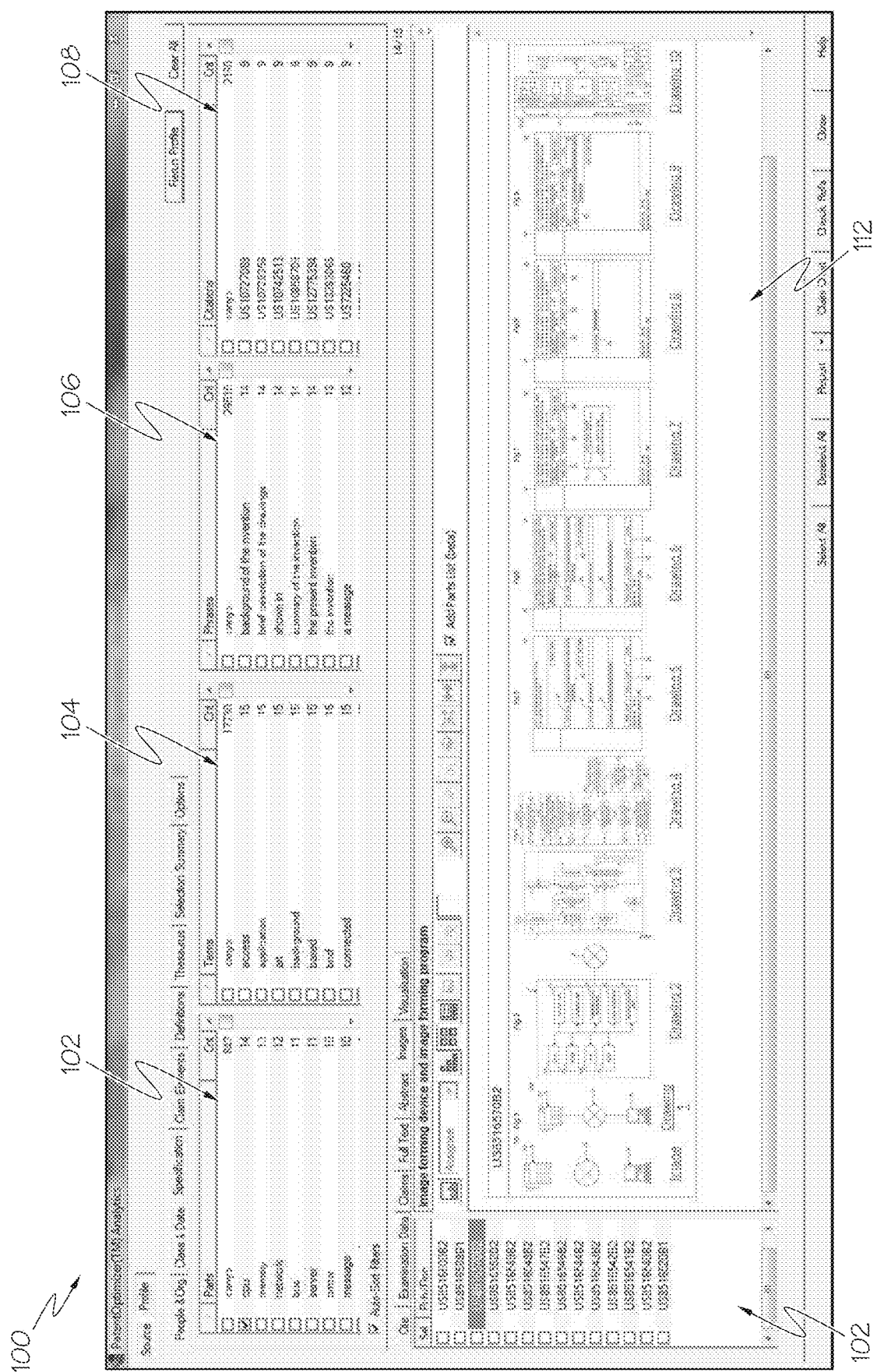
FIGS. 5 and 6 illustrate an exemplary graphical interface for viewing patent images according to one or more embodiments described and illustrated herein.

Embodiments of the present disclosure also enable users to utilize a variety of data filters, including a part expressions filter, to define a set of patent drawings having members containing the desired user attributes. Referring to FIG. 5, an example graphical interface 100 for viewing patent drawings is depicted. The illustrated graphical interface 100 includes a drawing display region 112 for displaying drawings of one or more selected patent-related documents meeting applied data filters, a patent-related document selection region 110 that allows a user to select one or more patent-related documents to evaluate, and several filter regions, including a parts region 102 to filter by part names appearing in the patent-related document, a terms region 104 to filter by terms appearing in the patent-related document, a phrases region 106 to filter by phrases, and a citations region 108 to filter by citation.

Figure 6:
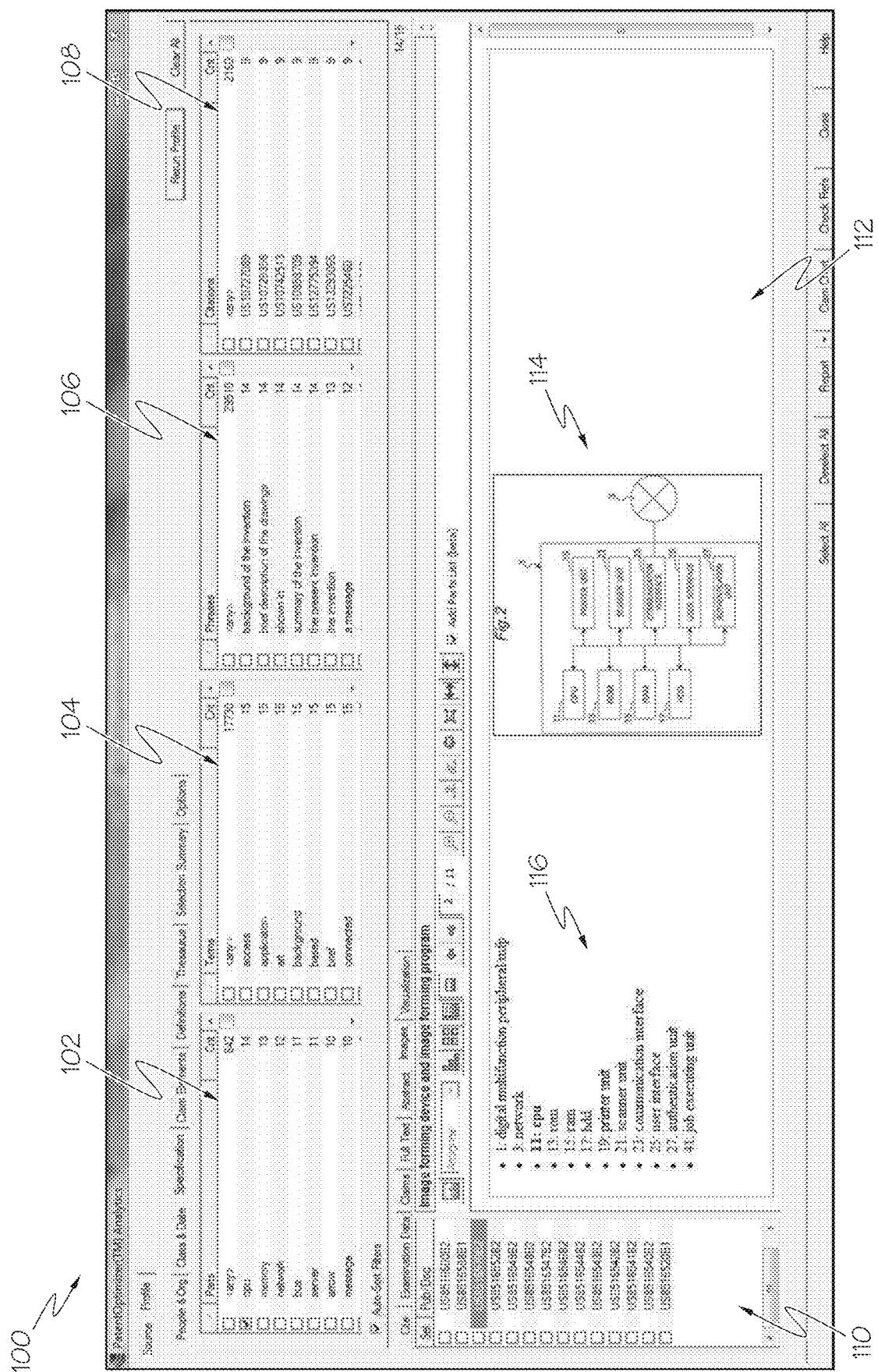

Patent drawings associated with one or more patent-related documents are displayed in the drawing display region 112. When a particular patent drawing is selected from the set, a list of all of the part names and part numbers contained in the selected drawing is presented alongside the drawing. FIG. 6 depicts the graphical interface 100 of FIG. 5 with the second drawing selected. The selected drawing is depicted in a drawing display region 114, and the associated part names and part numbers are listed in a parts listing region 116. The part numbers are extracted from the selected drawing, such as by optical character recognition, for example. The part numbers may be extracted upon selection by the user, or may be preprocessed and available upon selection. As described above, the parts index may be utilized to determine the part names associated with the extracted part numbers. In some embodiments, part names selected in the parts region 102 may be bolded or otherwise indicated in the parts listing region 116. In the illustrated example, "11: cpu" is bolded to indicate that this part is selected in the parts region 102.

In some embodiments, hovering a mouse over any of the part numbers appearing in the drawing exposes the related part name in a tooltip. Clicking on a part number in the drawing, or a listed part in the listing of parts, may navigate the user to the full text of the matching patent-related document wherein the selected part is discussed. This enables quick retrieval, inspection and filtering of those drawings having a specific user defined attribute, particularly as related to patent part names contained therein.

Figure 7:
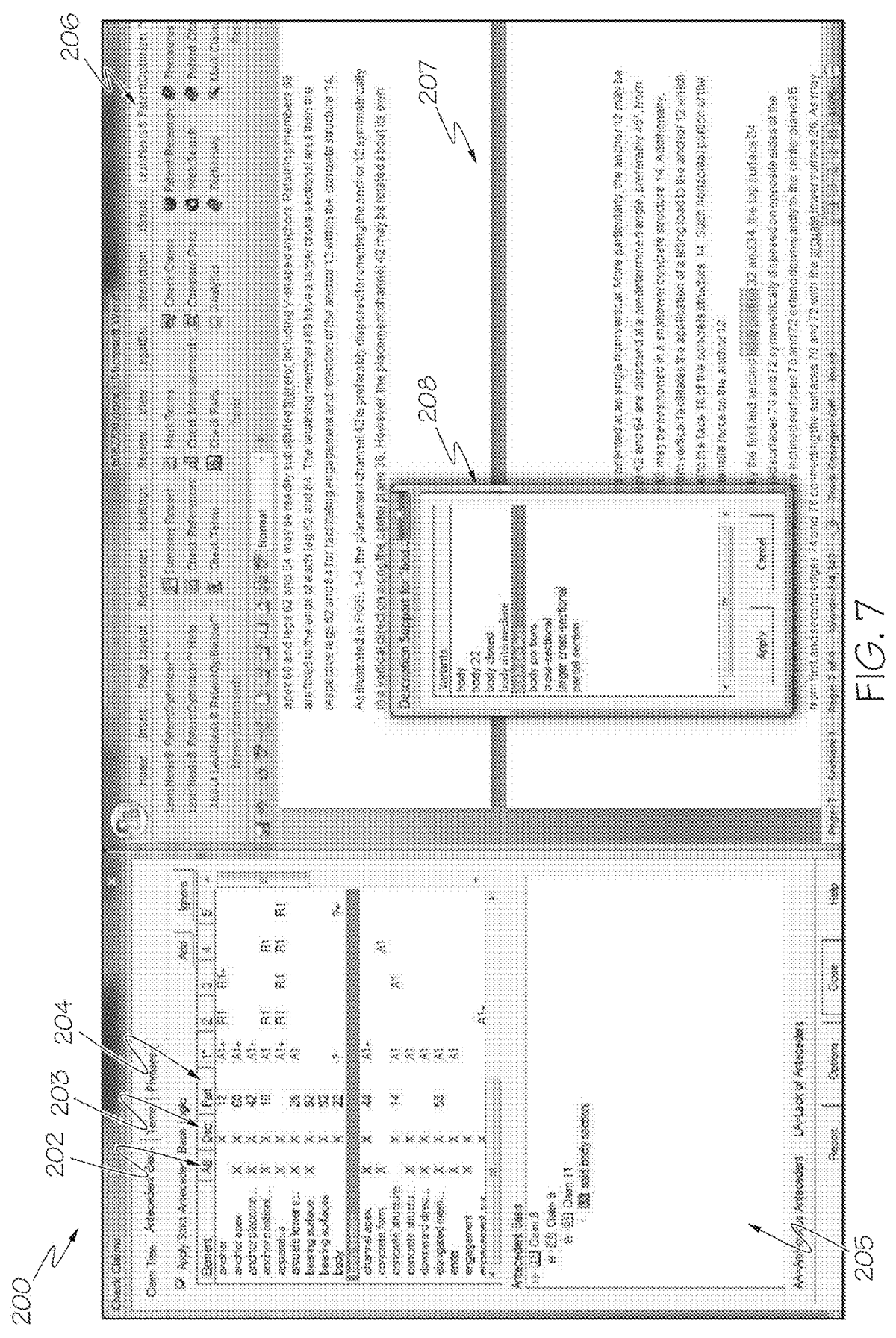

Referring now to FIG. 7, embodiments of the disclosure may be used to check for both literal and non-literal support for terms or phrases that appear within claims of a patent-related document. FIG. 7 depicts a graphical interface for evaluating claim terms of a patent-related document. The graphical interface 200 is illustrated as adjacent to a word processing application window 206 that displays a portion of the patent-related document 207 under evaluation. The graphical interface 200 includes a term region 201 and a claim tree region 205. The claim tree region 205 may display all or a portion of the claims in a hierarchical manner, as well as indicate whether or not there is antecedent basis for one or more terms in the claim.

The term region 201 lists each of the terms found within the patent-related document 207. The terms displayed in the term region 201 may be algorithmically determined from the text of the patent-related document. The illustrated term region 201 includes three columns: an antecedent basis column 202, a description support column 203, and a parts column 204. An "X" in the antecedent basis column 202 next to a term indicates that antecedent basis is provided for a particular term (e.g., there is antecedent basis for the claim term "anchor apex" in the illustrated example). Anteceded basis is not provided for the terms in which an "X" is absent (e.g., "anchor" in the illustrated example). The parts column 204 indicates the part number assigned to the claim term in the Detailed Description section and in the figures.

The description support column 203 provides an indication as to whether or not there is support for the claim terms/phrases. When there is literal support present (i.e., the system finds the exact claim term or phrase in the Detailed Description section), an "X" (or other graphical representation) is present in the description support column 203 for the particular claim term or phrase to indicate literal support. When there is no literal support for a claim term or phrase, an "X" is absent in the description support column 203 next to the particular claim term or phrase.

Still referring to FIG. 7, it is noted that the system did not find the example phrase "body section" in the Detailed Description section of the patent-related document. Therefore, because there is no literal support for "body section," an "X" is not present in the description support column 203 in the row associated with the phrase "body section."

In embodiments disclosed herein, the user may request that the system find variants of a claim term or phrase to determine non-literal, conceptual support for those claim terms or phrases without literal support. Variants may be terms or phrases that are conceptually similar to a selected word or phrase and determined using the parts thesaurus as described above (i.e., conceptual variant). Variants may also be terms or phrases that are structurally similar to the selected word or phrase (e.g., similar root terminology) (i.e., structural variant). For example, the phrase "mobile phone" may be a similar variant to the phrase "cellular phone" as they both share the word "phone." Similarly, the phrase "mobile device" may be a similar variant to the phrase "mobile phone" because both phrases include the word "mobile." Users may select to find variants that are conceptually similar to a selected word or phrase (e.g., a claim term), are structurally similar to the selected word or phrase, or both.

The parts thesaurus may be utilized to determine and display variants of a selected term or phrase that appears within the patent-related document. The user may then review the list of displayed variants and select one or more of the variants that he or she believe to be conceptually similar to the claim term or phrase. In this manner, the user associates the one or more selected variants with claim term or phrase, and the system then indicates that the variant(s) and the claim term or phrase are associated and non-literal, conceptual support is provided. The description support column 203 may provide a graphical indication on user-defined non-literal support. In the illustrated embodiment, a "U" is provided rather than an "X" to indicate non-literal, conceptual support. It should be understood that other graphical representations of non-literal support may be used.

As an example and not a limitation, a user may right-click (or otherwise select) the claim phrase "body section" to generate a variant display 208 that lists potential variants associated with "body section" (e.g., variants found by the "search for similar" and/or "search for conceptual" methods described above). In some embodiments, when the user selects a claim term or phrase (e.g., "body section"), a pop-up menu may appear that prompts the user to select "search similar" (i.e., find structurally similar variants as described above) or to select "search conceptual" (i.e., find conceptually similar variants as described above). The option to find both structurally similar and conceptually similar variants (and/or to search both types) may also be provided.

In other embodiments, a user may highlight, click, or otherwise select a term or phrase within the actual text of the document (e.g., a part name in the Detailed Description of a patent-related document). A pop-up menu may appear to either display a list of variants, or prompt the user to select how he or she would like to find variants (e.g., search similar, search conceptual, or both as described above). Selection of variant terms or phrases in the list may then navigate the user to the instances of the selected variant(s) within the text of the document.

It should be understood that there are other ways of presenting the list of variants and that embodiments are not limited to the variant display 208. The phrase "body section" may be applied to the parts thesaurus to generate a list of variants. This list of variants may then be compared with the terms and phrases appearing in the text of the patent-related document. Those variants that appear within the text of the patent-related document may then be presented to the user in the variant display 208. The user may then select (e.g., by use of a mouse or a touch screen input) one or more of the variants displayed in the variant display 208. In the illustrated embodiment, the user has selected variant "body portion" to be associated with the claim phrase "body section" displayed in the claim term region 201 of the graphical interface 200. The description support column 203 may then be updated with a "U" (or other indicator) in the row associated with "body section" to indicate that non-literal, conceptual support is present. Selection of the claim phrase "body section" may then highlight (and/or navigate the user to) the instances of claim phrase "body section" as well as variant "body portion" in the text of the patent-related document.

It is noted that the embodiments of determining and displaying variants described above may be utilized when viewing or editing electronic documents other than patent-related documents. Further, the variants described herein may be utilized for purposes other than finding support for claim terms and phrases within a patent-related document. Variants of selected terms or phrases may be determined and displayed within any type of document to assist the user in navigating within the document to terms and/or phrases that are similar to the selected term or phrase. As an example and not a limitation, a user may be viewing a scientific journal article about a particular topic and finds term X interesting. He or she may highlight or select term X to generate a list of variants occurring with the present document. Such variants may be variant terms X', X", and X'". The user may then select a variant term X', X", or X'" to navigate to the location of such a selected variant term within the text of the present document. In this manner, the user may navigate to sections of the scientific journal that discuss one or more topics similar to the discussion regarding selected term X.

Figure 8:
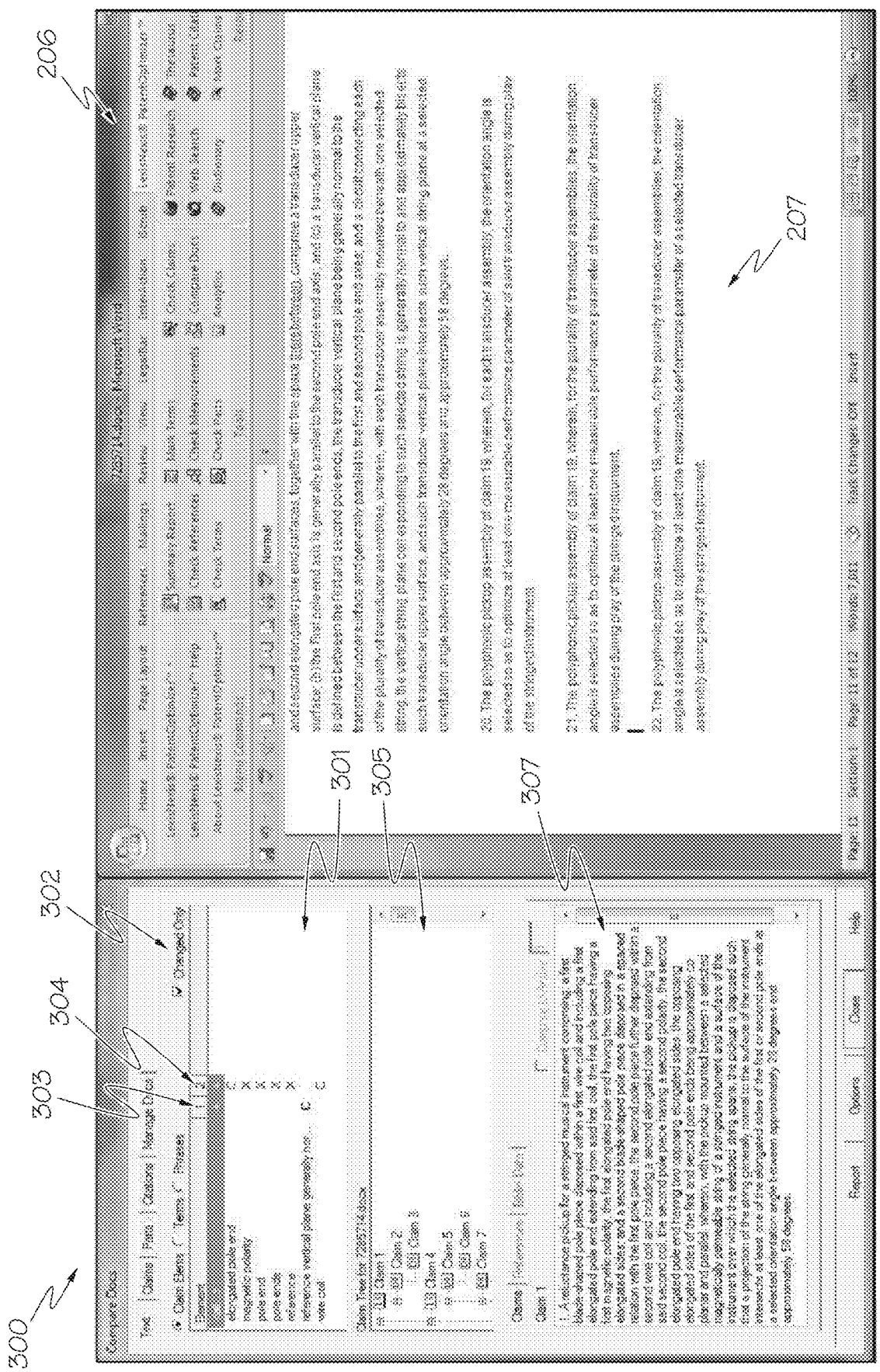
FIGS. 8-10 illustrate an exemplary graphical interface for comparing two or more patent-related documents according to one or more embodiments described and illustrated herein.

Referring now to FIG. 8, embodiments may also enable users to compare documents to determine if support for one or more claim terms/phrases is found in a compared document. As an example and not a limitation, a user may desire to determine if a claim term that appears in an issued patent is supported by a provisional patent application to which the issued patent claims priority. FIG. 8 depicts a graphical interface 300 for comparing two or more patent-related documents. The graphical interface 300 is depicted as adjacent to a word processing application window 206 that displays a portion of one of the patent-related documents 207 under evaluation. The example graphical interface 300 of the illustrated embodiment comprises a claim tree region 305, a claim language region 307, and a terms region 301. The claim tree region 305 may display all or a portion of the claims in a hierarchical manner, as well as indicate whether or not there is antecedent basis for one or more terms and phrases in the claim. The claim language region 307 may display the text of a selected claim.

The terms region 301 displays claim terms and phrases, terms found anywhere in the patent-related document, and phrases (i.e., multi-word terms) found anywhere in the document. In the illustrated embodiment, the "Claim Elems" radio button is selected to display in a list only those terms and phrases appearing in the claims. It is noted that FIG. 8 displays only a sub-set of claim terms and phrases appearing in the claim sets of the compared patent-related documents. The "Changed Only" selection box 302 allows a user to view only those terms or phrases that have changed between compared documents. It should be understood that all claim terms and phrases may be displayed by deselecting the "Changed Only" selection box. The terms region 301 has a first column 303 associated with a first compared patent-related document and a second column 304 associated with a second compared patent-related document. The names of the patent-related documents may also be provided. As an example and not a limitation, hovering a mouse over the first and second column 303, 304 indicators may display the name of the patent-related document in a pop-up text field.

The first and second columns 303, 304 indicate whether the claim term or phrase appears within that particular patent-related document, as well as if there is or is not literal support within the Detailed Description section of that patent-related document (as defined above). If the claim term or phrase is present within the particular patent-related document and there is literal support, an "X" (or other graphical representation) is provided in the column of the particular patent-related document and in the row associated with the claim term or phrase. As an example and not a limitation, the claim phrase "magnetic polarity" appears within the patent-related document associated with the second column 304, and there is literal support within the Detailed Description. Therefore, an "X" is present next to the claim phrase "magnetic polarity" in the second column 304. As another non-limiting example, the claim phrase "wire coil" appears within the claims of the patent-related document associated with the second column 304 but there is not literal support within the Detailed Description. Therefore, a "C" (or other graphical representation) is present next to the claim phrase "wire coil" in the second column 304.

Figure 9:
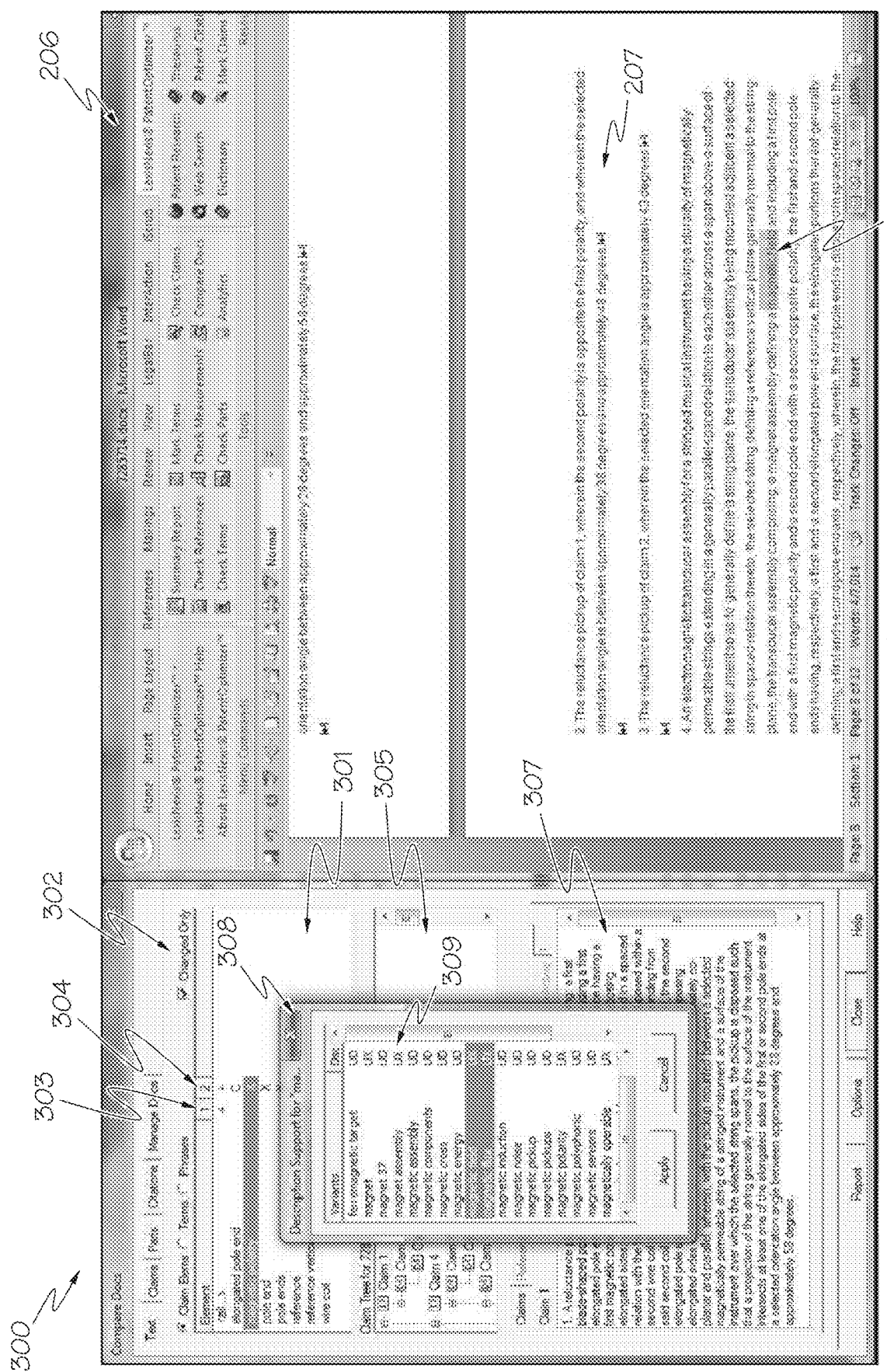

Therefore, claim terms and phrases may appear in one of the patent-related documents but not in the other. Therefore, there may not be literal support for a claim term or phrase appearing in a first patent-related document in a second, related patent-related document. Referring now to FIG. 9, embodiments of the present disclosure enable a user to associate claim terms and/or phrases appearing in one patent-related document with variants of the claim terms and/or phrases that appear in compared patent-related documents to therefore indicate non-literal, conceptual support between compared patent-related documents.

The graphical interface 300 may allow a user to select a claim term or phrase that appears in one patent-related document but not the other patent-related document (or multiple other patent-related documents). As an example and not a limitation, the system may allow a user to select a claim term or phrase by right-clicking the claim term or phrase with a mouse. This action may cause the system to generate variants of the selected claim term or phrase (e.g., by comparing the selected claim term or phrase with the parts thesaurus). The user may have the option to find structurally similar variants, conceptually similar variants, or both types of variants, as described above. The text of the compared patent-related documents may then be searched to determine if any of the variants are present within the compared patent-related documents.

A list of variants of the selected claim term or phrase that are used in the text of the compared patent-related documents may be presented to the user in a variant display 308. The variant display 308 lists such variants of the selected claim term or phrase. The user may then review the list of variants and select one or more as applicable. Selection of the variant(s) associates the selected variant(s) with the selected claim term or phrase. In some embodiments, the graphical interface 300 is then updated to indicate the association of the claim terms/phrases with selected variants. As an example and not a limitation, the first or second column may be populated with a "U" (or other graphical representation) when a user has indicated non-literal, conceptual support by selection of variants as described herein. In some embodiments, selection of a claim term or phrase not only highlights the claim term or phrase in the text of the patent-related document, but also highlights any selected variants within the text. Further, the system may also allow the user to navigate to instances of not only the selected claim term or phrase within the text of the patent-related document, but also to instances of any selected variants (e.g., highlighted claim term 209).

In the non-limiting illustrated example, the claim phrase "magnetic polarity" is selected by the user. The variant display 308 provides the user a list of variants of the claim phrase "magnetic polarity." The user has selected variants "magnetic field" and "magnetic flux," which then associates these variants with the claim phrase "magnetic polarity." The terms region 301 may then be updated with a "U" in the first column 303 and the row associated with the claim phrase "magnetic polarity." Further, instances of "magnetic polarity," "magnetic field," and "magnetic flux" may be highlighted in the text displayed in the word processing application window 206 (e.g., highlighted text "magnetic field" in FIG. 9). The system may also allow navigation to these terms within the text of the patent-related document.

In some embodiments, the variant display 308 also provides an indication 309 as to what type of support is provided for the listed variants. Variants found in the Detailed Description section may be indicated by a "UD" in column 309 (e.g., "ferromagnetic target" illustrated in FIG. 9). Variants found in the claims may be indicated by a "UC." Variants found in both the claims and the Detailed Description section may be indicated by a "UX." It should be understood that indicators other than "UD," "UC," and "UX" may be utilized.

Figure 10:
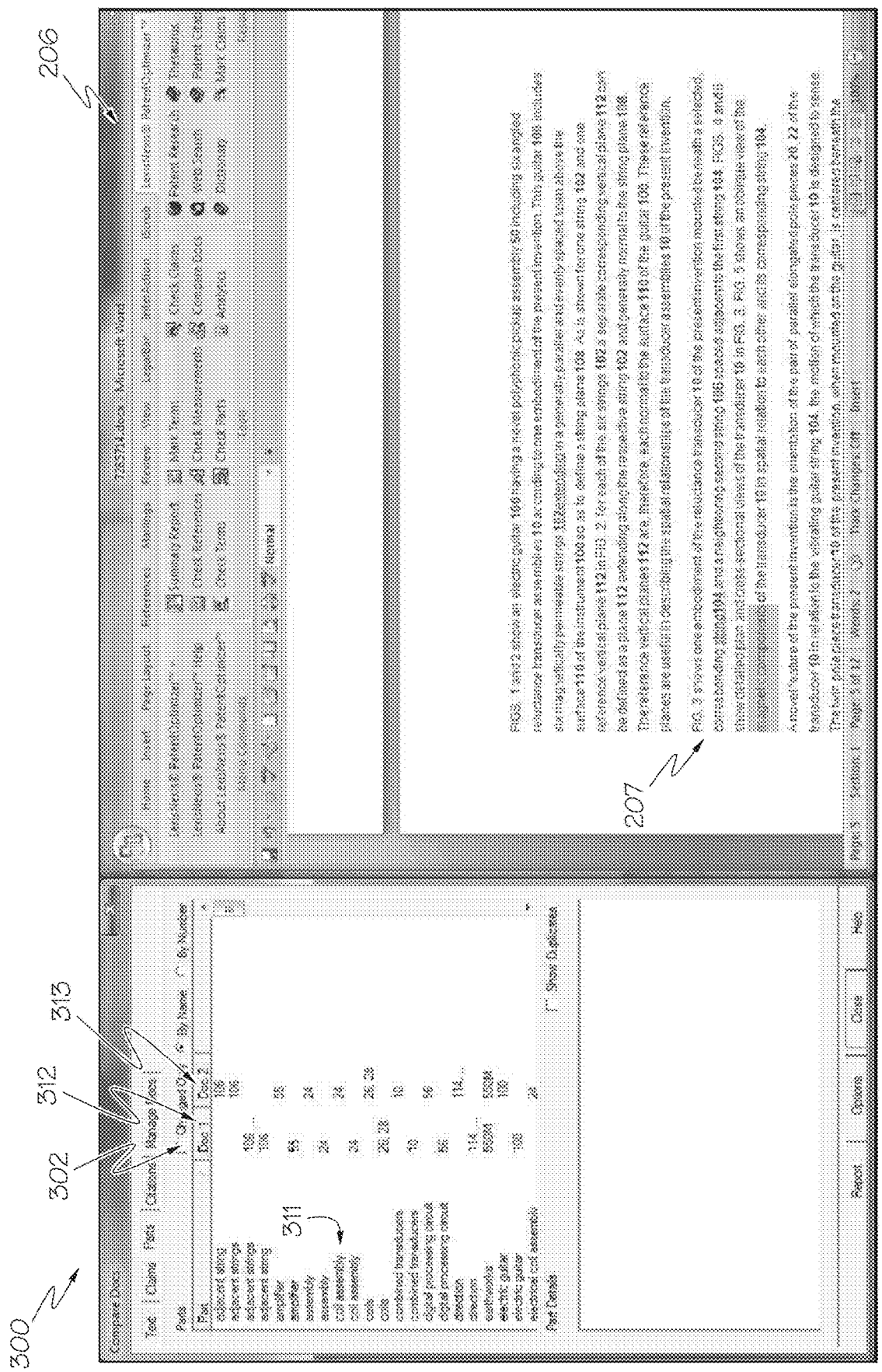

In some embodiments, parts may be compared between two or more documents. Referring now to FIG. 10, the graphical interface 300 is shown wherein a "Parts" 310 tab is selected to display a parts region 311. A "Changed Only" selection box 302 allows a user to view only those parts that have changed (or are otherwise different) between compared documents. FIG. 10 depicts the graphical interface 300 with the "Changed Only" selection box 302 as deselected. All of the numbered parts between the compared documents will appear in the parts region 311 when the "Changed Only" selection box 302 is deselected. Accordingly, embodiments of the present disclosure may allow a user to see the differences (and similarities) between parts and their respective part numbers between compared documents.

Figure 11A:
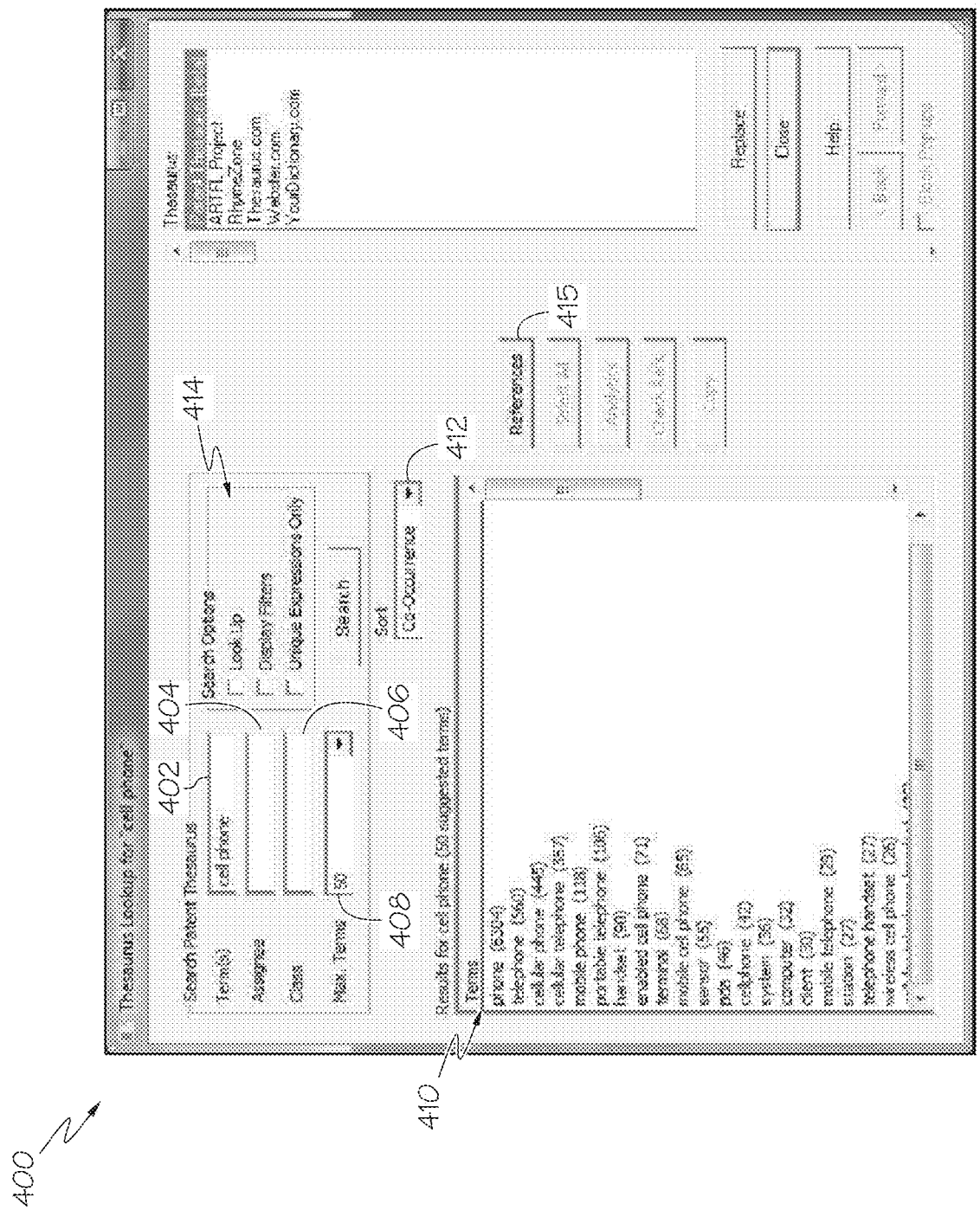
FIGS. 11A and 11B illustrate exemplary graphical interfaces of a thesaurus according to one or more embodiments described and illustrated herein.

Various embodiments of using a parts thesaurus will now be described. FIG. 11A illustrates a graphical interface 400, which may include an interface presented to a user for using a thesaurus. The user may use graphical interface 400, for example, to identify variants of user-input terms. As described above, a "variant" of a term may include one or more words associated with the term, such as words that are synonymous with the term. As shown in FIG. 11A, possible variants for the term "cell phone" may include the words "phone," "telephone," and "cellular phone." A variant of a term may also include words that frequently appear together with the term. As also shown in FIG. 11A, for example, variants for the term "cell phone" may also include the words "interface," "system," and "antenna."

Consistent with disclosed embodiments, several different methods may be used in determining variants, some of which are described above. In one exemplary method, drawing references in a patent-related document having different descriptions (i.e., part names) but the same identifier (i.e., part number) may be determined to be variants of one another. For example the drawing references "hollow tube 10," "cylindrical body 10," and "empty tube 10" appearing in a patent-related document may be determined to be variants of one another. In another exemplary method, a first set of variants in a first patent-related document may be linked with a second set of variants in a second patent-related document. For example, if the first set of variants includes the drawing reference "hollow tube 10," and the second set of variants includes the drawing reference "hollow tube 24," these references may be determined to be referring to the same part.

Referring once again to FIG. 11A, a search query comprising one or more terms may be input into input field 402, which is labeled as "Term(s)." Additional search criteria, such as assignee and class information for patent-related documents, may be input into input fields 404 and 406, labeled "assignee" and "class," respectively. Similarly, the maximum number of search results to display may be selected in input field 408, labeled "max. terms." Selection fields 412 and 414 may correspond to sort options and search options, respectively, and are discussed below with respect to FIGS. 13A, 13B and 14A-14C. The search results, which may correspond to a listing of variants of the search query, may be displayed in output area 410.

Figure 11B:
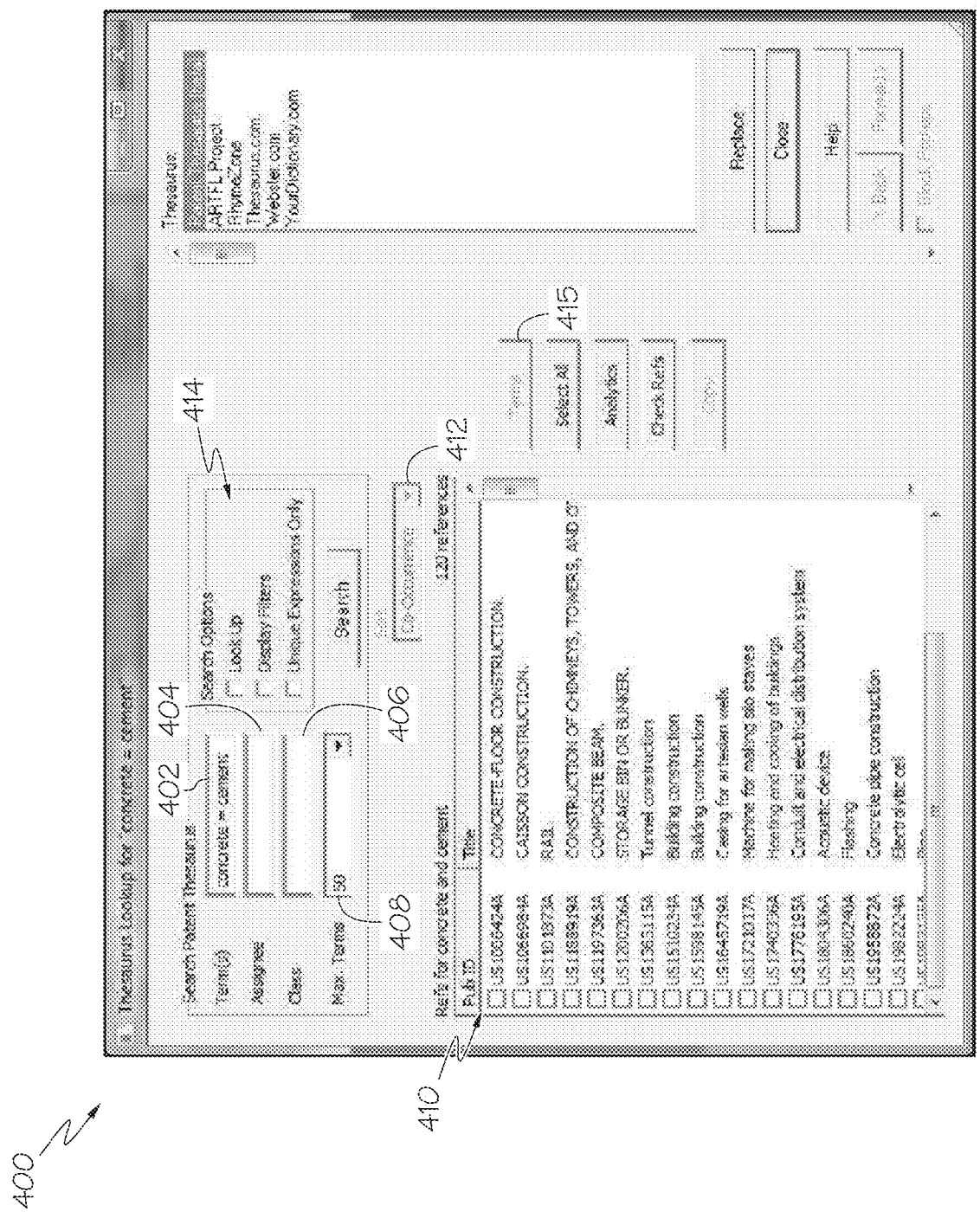

As will be discussed with reference to FIGS. 12A and 12B below, a user may select one or more of the variants to retrieve information corresponding to the patent-related documents in which the variants appear. FIG. 11B illustrates an additional format for inputting a search query into input field 402. Consistent with disclosed embodiments, entering a query in the format "X=Y" may correspond to a search for equivalents, such as a search for patent-related documents that use a first term X and a second term Y interchangeably. In the example provided in FIG. 11B, the search query "concrete=cement" may determine whether the terms "concrete" and "cement" have been discussed interchangeably in patent-related documents. Patent-related documents matching this criterion (and any other selected search criteria) may be listed in output area 410.

Terms may be determined to be used interchangeably by any number of methods. For example, a first term may be used interchangeable with a second term when the same part number is associated with both the first term and the second term, which are both part names. For example, the first term "hollow tube" and "cylindrical tube" may both have part number "10" assigned thereto. As another example, a patent-related document may positively recite that a first term is an equivalent to a second. As an example and not a limitation, a patent-related document may recite that "any fastener may be utilized, such as a screw, bolt or nail." In this example, screws, bolts and nails are equivalents and may be considered to be used interchangeably. The text of patent-related documents may be analyzed to determine such equivalents between terms.

Figure 12A:
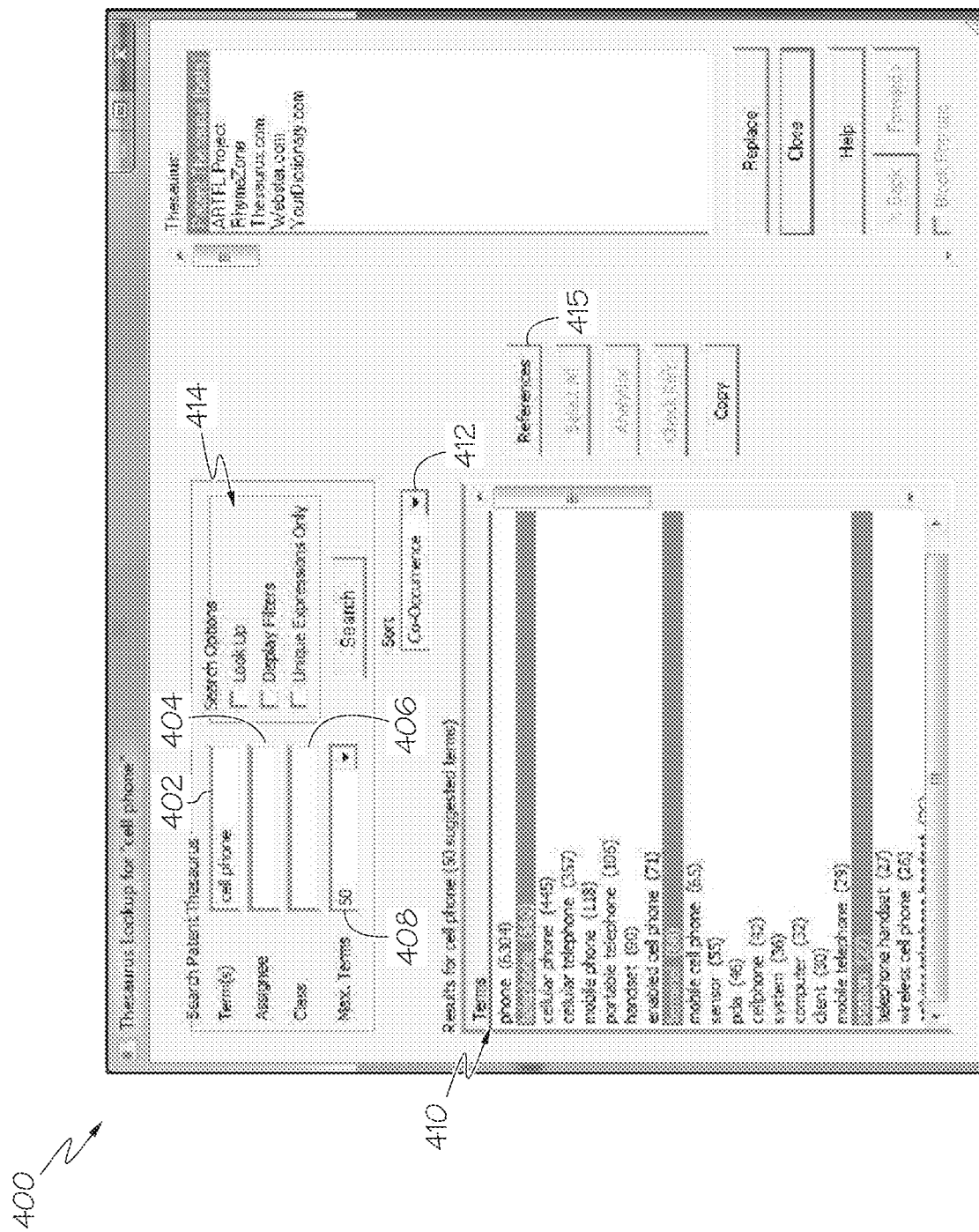
FIGS. 12A and 12B illustrate exemplary graphical interfaces of a thesaurus showing selection of variants and a listing of patent-related documents according to one or more embodiments described and illustrated herein.
Figure 12B:
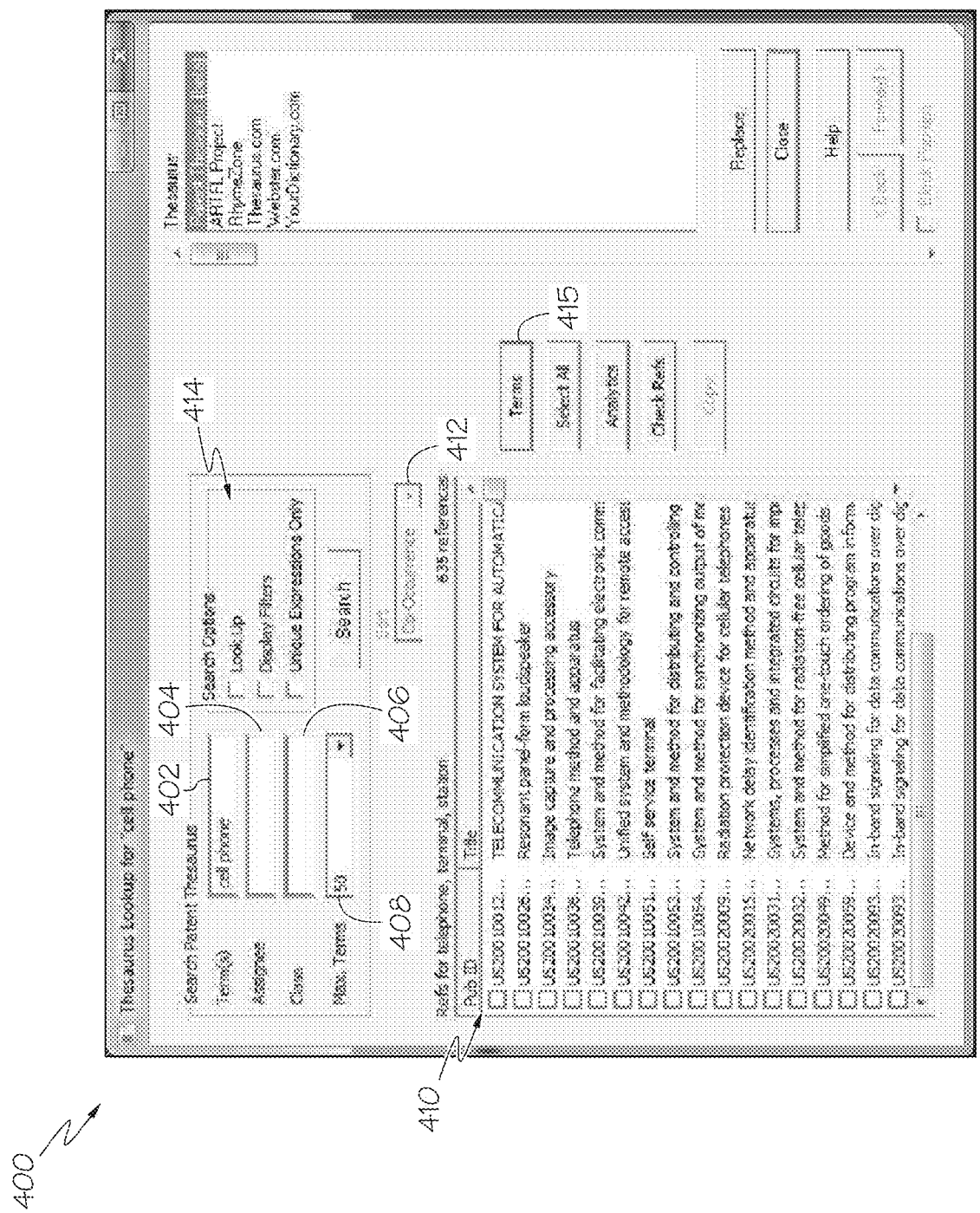

FIGS. 12A and 12B illustrate a graphical interface similar to the graphical interface 400 discussed with respect to FIGS. 11A and 11B. Accordingly, similar reference numerals may be used in the following discussion of FIGS. 12A and 12B. FIG. 12A illustrates the selection of a plurality of search term variants (i.e., "variants" or "term variants") listed in output area 410. Specifically, the variants "telephone (560)," "terminal (68)," and "station (27)" have been selected in FIG. 12A. The number in parenthesis next to each variant may indicate the number of patent-related documents meeting the search criteria in which the variant occurs. Based on the selection of variants, a listing of patent-related documents may then be listed in output area 410 upon selection of button 415, as shown in FIG. 12B. This listing may provide a citation identifier (e.g., patent number, published patent application number) and description (e.g., title) for each patent-related document, thereby displaying a plurality of citations.

Figure 13A:
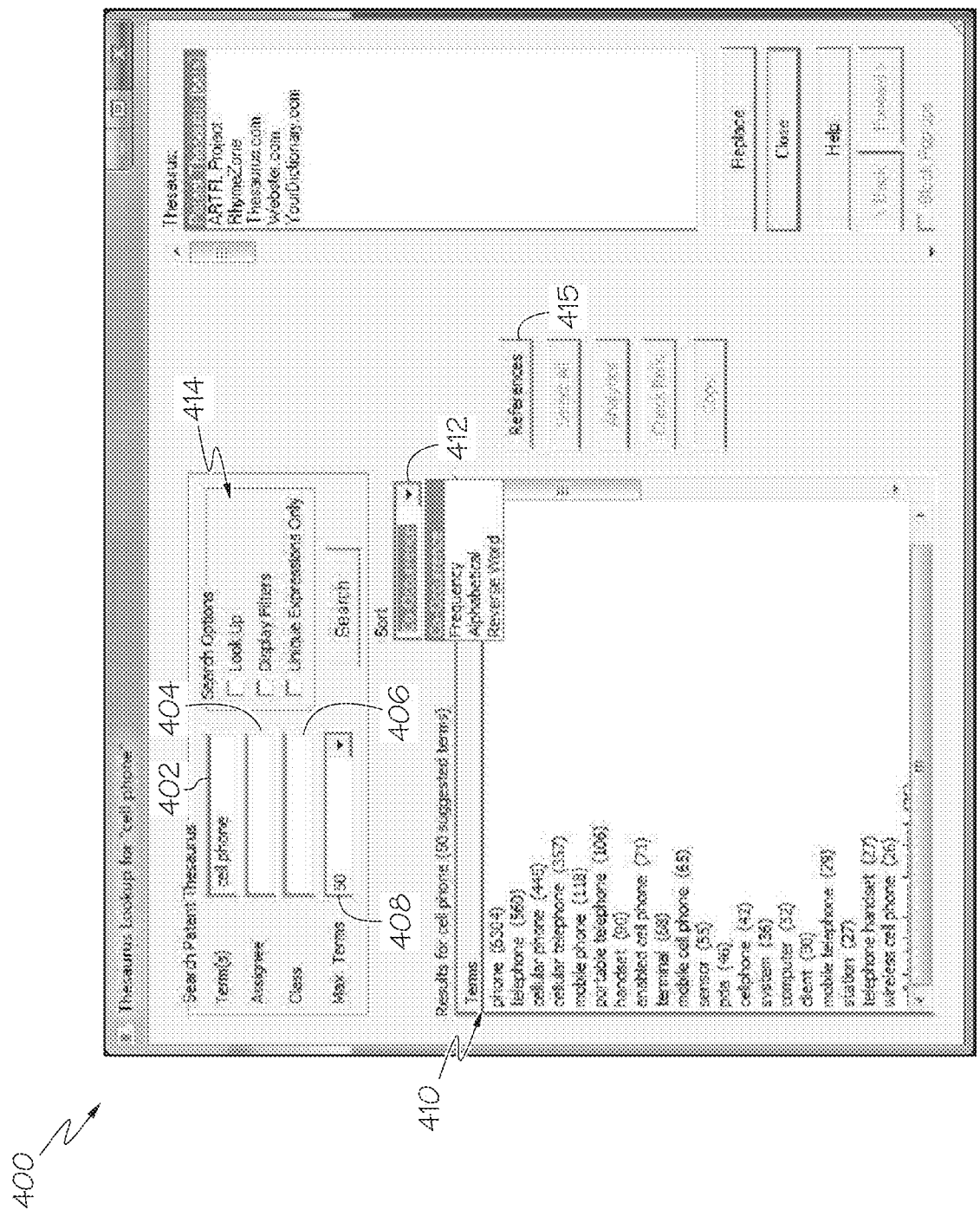
FIGS. 13A and 13B illustrate exemplary graphical interfaces of a thesaurus showing various sorting options according to one or more embodiments described and illustrated herein.
Figure 13B:
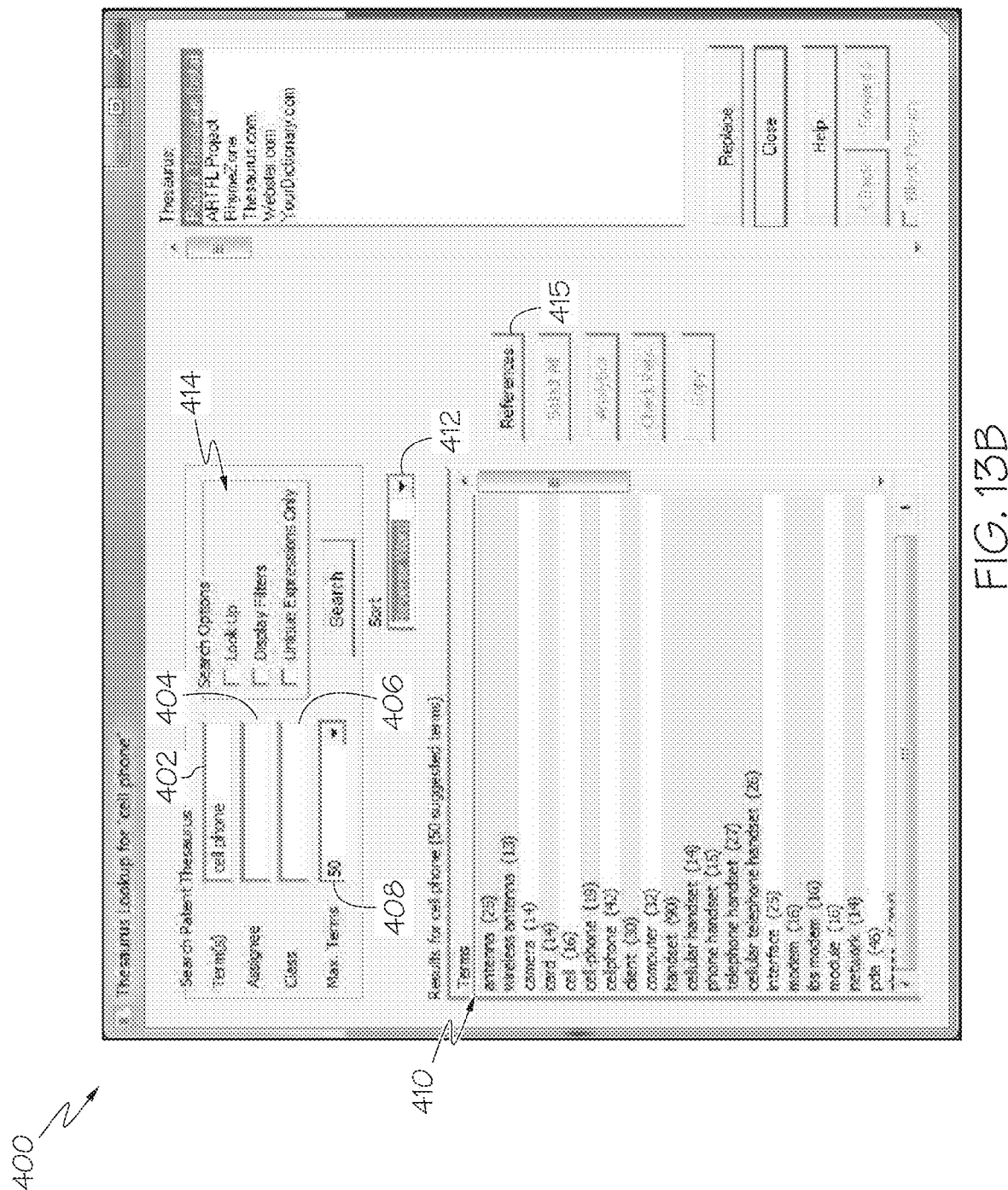

FIGS. 13A and 13B illustrate a graphical interface similar to the graphical interface 400 discussed above. Accordingly, similar reference numerals may be used in the following discussion of FIGS. 13A and 13B. FIG. 13A illustrates various sorting options 412 that may be applied to the search results to be listed in output area 410. The sorting options may include "co-occurrence," "frequency," "alphabetical," and "reverse word," and may be displayed in selection field 412 (e.g., in a drop-down menu format).

Selecting "co-occurrence" sorting option may sort the search results based on the total number of patent-related documents including both the search query (provided in to input field 402) and each respective term variant. In the illustrated example, the term variant "phone" co-occurs with the search term "cell phone" in the most number of patent-related documents.

Selecting "frequency" may sort the search results based on the cumulative number of times each respective variant appears within the set of patent-related documents. For example, as illustrated in FIG. 13A, while the variant "terminal (68)" may appear together with the search query term "cell phone" 68 times in patent-related documents, it may appear by itself in the set of patent-related documents a much greater number of times. Selecting the "alphabetical" sort option may sort the search results (i.e., the variants) in alphabetical order.

Finally, selection of the "reverse word" sorting option may sort the search results based on noun roots in reverse order. For instance, as shown in FIG. 13B, the variant "assistant (3)," which may be considered a noun root, is listed before other variants containing the word "assistant," such as "digital assistant (3)," (also a noun root) and "personal digital assistant (3)."

Figure 14A:
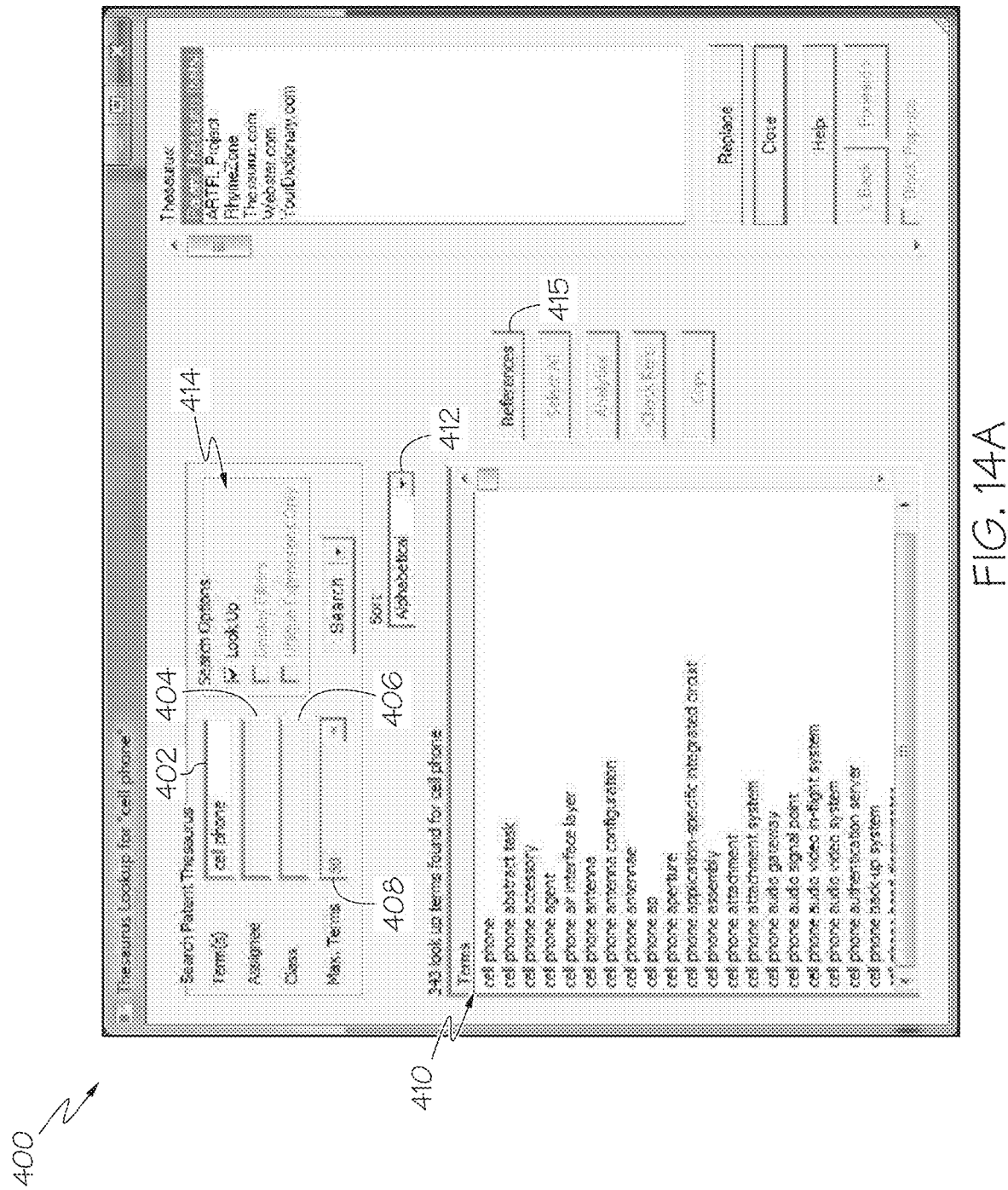
FIGS. 14A-14C illustrate exemplary graphical interfaces of a thesaurus showing various search options according to one or more embodiments described and illustrated herein.
Figure 14B:
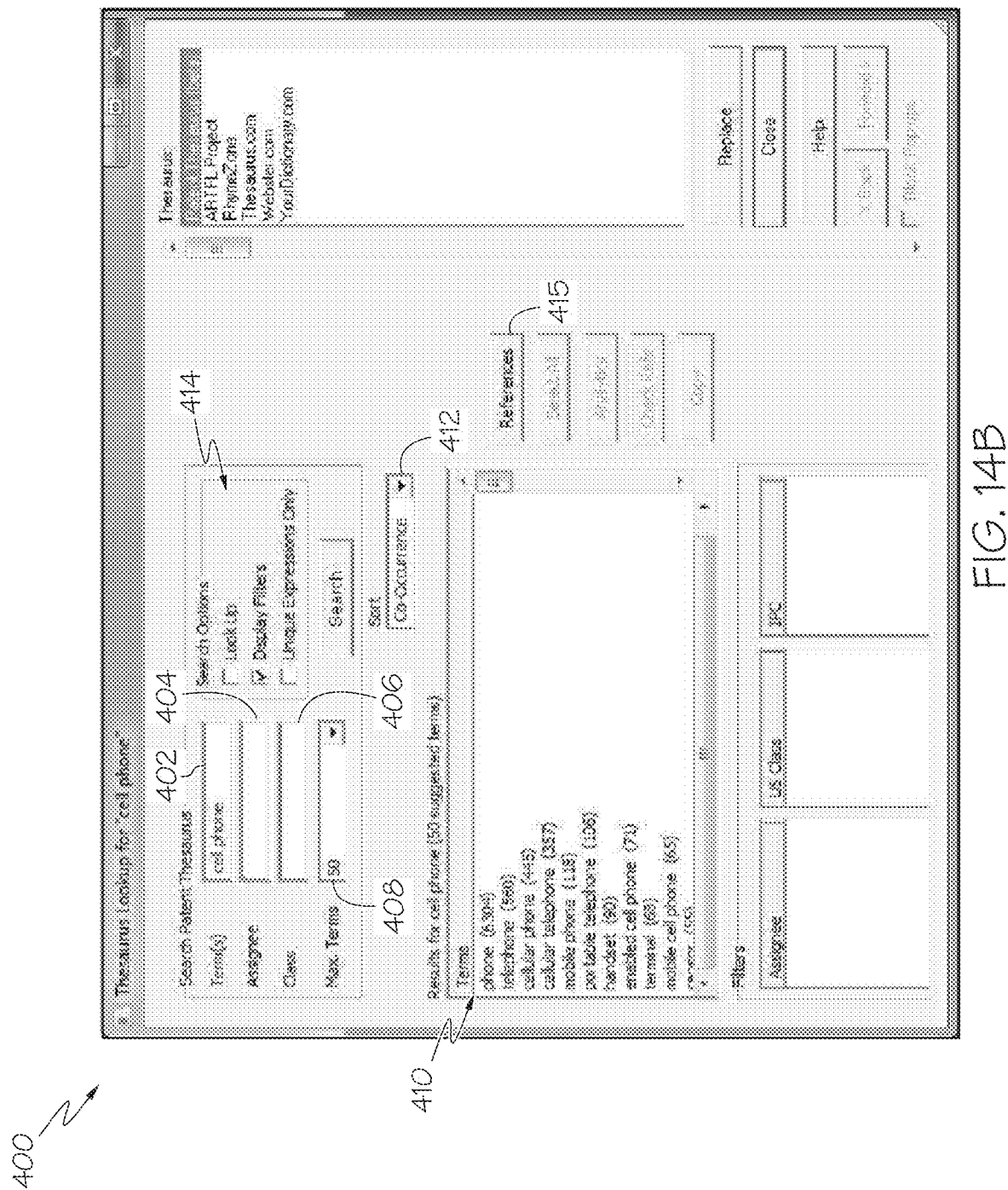
Figure 14C:
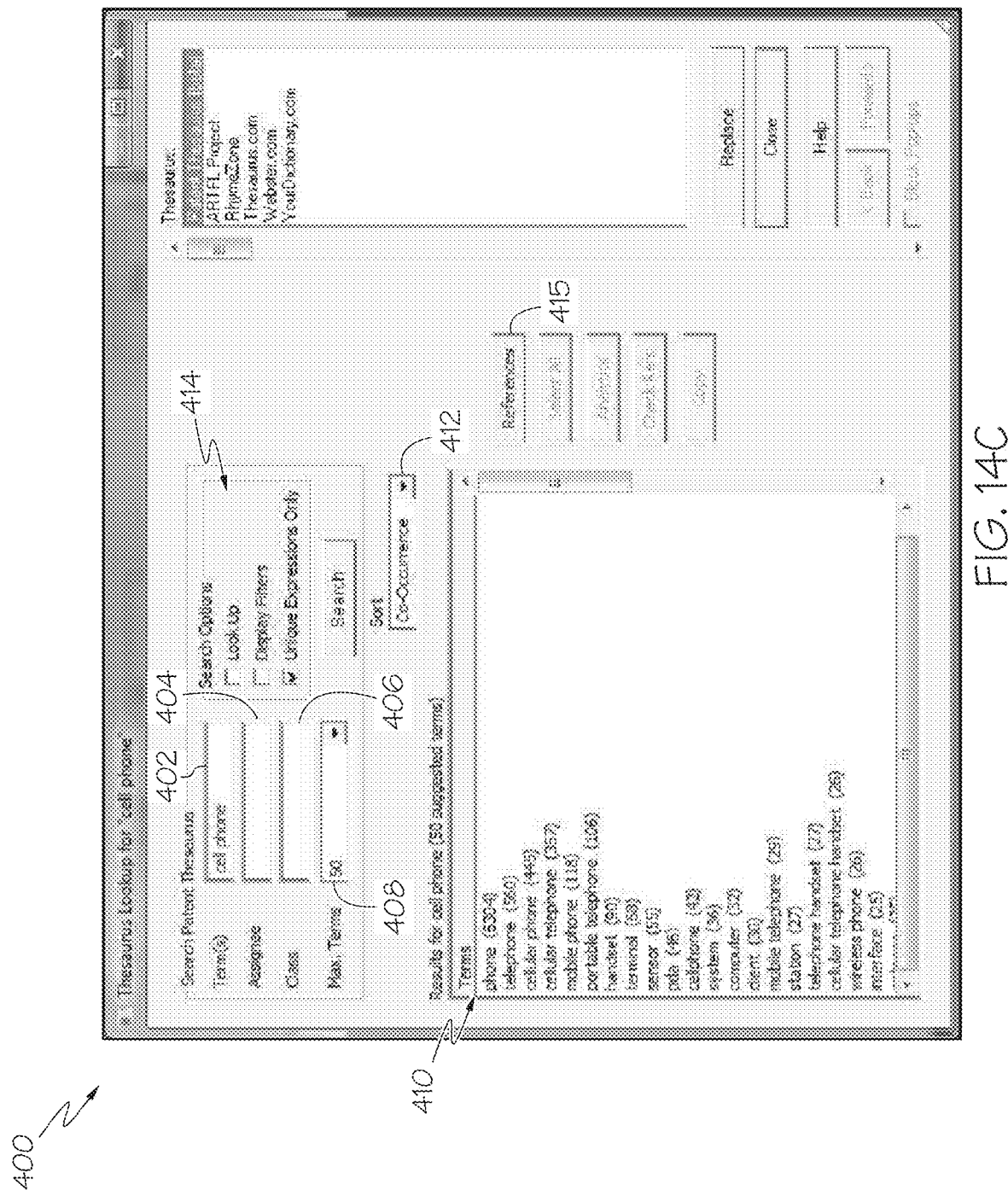

FIGS. 14A-14C illustrate a graphical interface similar to the graphical interface 400 described above. Accordingly, similar reference numerals may be used in the following discussion of FIGS. 14A-14C. FIGS. 14A-14C illustrate various search options that may be used in conjunction with other search criteria associated with a search query provided into input field 402. The search options may include "look up," "display filters," and "unique expressions only," and may be displayed in a selection field 414. It should be understood that more or fewer search options may be displayed in the selection field 414.

As shown in FIG. 14A, selecting the "look up" search option for the search query "cell phone" may provide a listing of terms beginning with the phrase "cell phone" in output area 410. The "look up" search option may also provide a listing of terms containing the phrase "cell phone" or ending with the phrase "cell phone." Selecting one of these terms may enable the retrieval of term variants related to the selection. In addition, the search option "display filters" may be used to filter term variants by bibliographic information. As illustrated in FIG. 14B, selecting the "display filters" search option may generate a set of filters beneath output area 410. The filters may, for example, include fields such as "assignee," "US class," and "IPC." Different values for one or more fields may be used as criteria to filter the term variants. Finally, the search option "unique expressions only" may be used to exclude term variants containing the word or phrase in the search query from the search results displayed in output area 410. For example, as illustrated in FIG. 14C, selecting "unique expressions only" when the search query is "cell phone" will exclude from the search results any term variant containing the phrase "cell phone."

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of automatically determining whether a term located in a claims section of a patent document has non-literal support in a patent-related document, the method comprising:
receiving, from a client device, a search query;
accessing, by a patent analyzing device, a document corpus in response to receiving the search query;
displaying, on the client device, a list of terms appearing in the patent-related document;

displaying, on the client device, a graphical representation of a literal support status for each term within the list of terms, wherein the literal support status indicates literal support is or is not present within a specification of the patent-related document;

upon receiving, by the client device, a selected term from the list of terms appearing in the specification of the patent-related document, accessing a memory or a database of the patent analyzing device to determine a plurality of acceptable part name candidates;

paring, by the patent analyzing device, the plurality of acceptable part name candidates into a plurality of variants based on a predetermined threshold of a frequency that the terms appear in the document corpus, the plurality of variants determined from a group consisting of using a parts index to determine synonyms of the plurality of acceptable part name candidates based on an occurrence of a plurality of part labels within the patent-related document, grouping the plurality of acceptable part name candidates into a part reference data to determine when a same last word appears in the patent-related document, and grouping the plurality of acceptable part name candidates that have the same part number;

generating, by the patent analyzing device, one or more variant suggestions related to the selected term from the plurality of variants and transmitting the one or more variant suggestions to the client device;

displaying, by the client device, the one or more variant suggestions;

receiving one or more selected variant suggestions from the one or more variant suggestions;

associating the one or more selected variant suggestions with the selected term; and displaying, on the client device, a graphical representation of an association between the selected term and the one or more selected variant suggestions, wherein the association is indicative of non-literal support for the selected term.

2. The method of claim 1, further comprising, prior to generating one or more variant suggestions, displaying a variant search option to search for structurally similar variant suggestions, conceptually similar variant suggestions, or both.

3. The method of claim 2, further comprising receiving a selected variant search option, wherein:

displaying structurally similar variant suggestions if the variant search option selected is to search for structurally similar variant suggestions;

displaying conceptually similar variant suggestions if the variant search option selected is to search for conceptually similar variant suggestions; and displaying structurally similar variant suggestions and conceptually similar variant suggestions if the variant search option selected is to search for both structurally similar variants and conceptually similar variants.

4. The method of claim 1, wherein each term in the list of terms appearing in the patent-related document is a claim term, and the literal support status indicates whether literal support is or is not present within a detailed description second of the patent-related document.

5. The method of claim 1, further comprising displaying a user equivalents table comprising the selected term and the one or more selected variant suggestions.

6. The method of claim 1, further comprising navigating a cursor to instances of the one or more selected variant suggestions in a text of the patent-related document.

7. The method of claim 1, wherein
the one or more variant suggestions are displayed in a frequency-inverse document frequency.

8. The method of claim 1, wherein a graphical interface presents, in an integrated single display adjacent to the patent related document, the graphical representation of the literal support status for each term within the list of terms, the one or more variant suggestions, and the graphical representation of the association between the selected term and the one or more selected variant suggestions.

9. A method of automatically determining whether a term located in a claims section of a patent document has non-literal support in a patent-related document, the method comprising:

receiving, from a client device, a search query;

accessing, by a patent analyzing device, a document corpus in response to receiving the search query;

displaying, on the client device, a list of terms appearing in a first patent-related document and a second patent-related document;

displaying, on the client device, a graphical representation of whether individual terms in the list of terms appear in a specification of the first patent-related document or in a specification of the second patent-related document;

upon receiving, by the client device, a selected term from the list of terms, wherein the selected term does not appear within the first patent-related document or the second patent-related document, accessing, a memory or a database of the patent analyzing device to determine a plurality of acceptable part name candidates;

paring, by the patent analyzing device, the plurality of acceptable part name candidates into a plurality of variants based on a predetermined threshold of a frequency that the terms appear in the document corpus, the plurality of variants determined from a group consisting of using a parts index to determine synonyms of the plurality of acceptable part name candidates based on an occurrence of a plurality of part labels within the patent-related document, grouping the plurality of acceptable part name candidates into a part reference data to determine when a same last word appears in the patent-related document, and grouping the plurality of acceptable part name candidates that have the same part number;

generating, by the patent analyzing device, one or more variant suggestions related to the selected term from the plurality of variants and transmitting the one or more variant suggestions to the client device;

displaying, by the client device, one or more variant suggestions related to the selected term;

receiving one or more selected variant suggestions from the one or more variant suggestions;

associating the one or more selected variant suggestions with the selected term; and displaying, on the client device, a graphical representation of an association between the selected term and the one or more selected variant suggestions, wherein the association is indicative of non-literal support for the selected term;

wherein the first patent related document and the second patent related document are in a same family of patent related documents.

10. The method of claim 9, further comprising, prior to generating one or more variant suggestions, displaying a variant search option to search for structurally similar variant suggestions, conceptually similar variant suggestions, or both.

11. The method of claim 10, further comprising receiving a selected variant search option, wherein:
displaying structurally similar variant suggestions if the variant search option selected is to search for structurally similar variant suggestions;
displaying conceptually similar variant suggestions if the variant search option selected is to search for conceptually similar variant suggestions; and
displaying structurally similar variant suggestions and conceptually similar variant suggestions if the variant search option selected is to search for both structurally similar variants and conceptually similar variants.

12. The method of claim 9, wherein displaying a graphical representation of whether or not individual terms in the list of terms appear in the first patent-related document or the second patent-related document further comprises:
displaying a first graphical representation if individual terms are present in a claims section of the first patent-related document or the second patent-related document, displaying a second graphical representation if individual terms are present in a detailed description section of the first patent-related document or the second patent-related document, and displaying a third graphical representation if individual terms are present in both the claims section and the detailed description section of the first patent-related document or the first patent-related document.

13. The method of claim 9, wherein the list of terms further comprises individual terms appearing in one or more additional patent-related documents.

14. The method of claim 9, wherein
the one or more variant suggestions are displayed in a frequency-inverse document frequency.

15. A method of automatically determining whether a term located in a claims section of a patent document has non-literal support in a patent-related document, the method comprising:
receiving, from a client device, a search query;
accessing, by a patent analyzing device, a document corpus in response to receiving the search query;
displaying, on the client device, a list of terms appearing in the patent-related document;
displaying, on the client device, a graphical representation of a literal support status for each term within the list of terms, wherein the literal support status indicates literal support is or is not present within a specification of the patent-related document;
upon receiving, by the client device, a selected term from the list of terms not appearing in the specification of the patent-related document, accessing a memory or a database of the patent analyzing device to determine a plurality of acceptable part name candidates;
paring, by the patent analyzing device, the plurality of acceptable part name candidates into a plurality of variants based on a predetermined threshold of a frequency that the terms appear in the document corpus, the plurality of variants determined from a group consisting of using a parts index to determine synonyms of the plurality of acceptable part name candidates based on an occurrence of a plurality of part labels within the patent-related document, grouping the plurality of acceptable part name candidates into a part reference data to determine when a same last word appears in the patent-related document, and grouping the plurality of acceptable part name candidates that have the same part number;
generating, by the patent analyzing device, one or more variant suggestions related to the selected term from the plurality of variants and transmitting the one or more variant suggestions to the client device;
displaying a variant search option to search for structurally similar variant suggestions, conceptually similar variant suggestions, or both;
displaying, by the client device, the one or more variant suggestions related to the selected term;
receiving one or more selected variant suggestions from the one or more variant suggestions;
associating the one or more selected variant suggestions with the selected term;
displaying, on the client device, a graphical representation of an association between the selected term and the one or more selected variant suggestions, wherein the association is indicative of non-literal support for the selected term, and
displaying, on the client device, a user equivalents table comprising the selected term and the one or more selected variant suggestions,
wherein a graphical interface presents, in an integrated single display adjacent to the patent related document, the graphical representation of the literal support status for each term within the list of terms, the one or more variant suggestions, and the graphical representation of the association between the selected term and the one or more selected variant suggestions.

16. The method of claim 15, further comprising receiving a selected variant search option, wherein:
displaying structurally similar variant suggestions if the variant search option selected is to search for structurally similar variant suggestions;
displaying conceptually similar variant suggestions if the variant search option selected is to search for conceptually similar variant suggestions; and
displaying structurally similar variant suggestions and conceptually similar variant suggestions if the variant search option selected is to search for both structurally similar variants and conceptually similar variants.

17. The method of claim 15, further comprising displaying a user equivalents table comprising the selected term and the one or more selected variant suggestions.

18. The method of claim 15, further comprising navigating a cursor to instances of the one or more selected variant suggestions in a text of the patent-related document.

19. The method of claim 15, wherein
the one or more variant suggestions are displayed in a frequency-inverse document frequency.

20. The method of claim 9, wherein a graphical interface presents, in an integrated single display adjacent to the patent related document, the graphical representation of whether individual terms in the list of terms appear in the specification of the first patent-related document or the specification of the second patent-related document, displays one or more variant suggestions related to the selected term, and displays the graphical representation of the association between the selected term and the one or more selected variant suggestions.

* * * * *